(12) United States Patent
Shima et al.

(10) Patent No.: US 9,028,249 B2
(45) Date of Patent: May 12, 2015

(54) METHODS AND SYSTEMS FOR RECOVERY OF CO₂ GAS IN CEMENT-MANUFACTURING FACILITIES, AND PROCESSES FOR MANUFACTURING CEMENT

(75) Inventors: Hirokazu Shima, Ibaraki (JP); Naohiro Higuchi, Ibaraki (JP); Yoshinori Takayama, Ibaraki (JP); Takuya Komatsu, Ibaraki (JP); Junzhu Wang, Ibaraki (JP)

(73) Assignee: Mitsubishi Materials Corporation, Tokyo (JP)

( * ) Notice: Subject to any disclaimer, the term of this patent is extended or adjusted under 35 U.S.C. 154(b) by 154 days.

(21) Appl. No.: 13/389,739

(22) PCT Filed: Oct. 12, 2010

(86) PCT No.: PCT/JP2010/006047
§ 371 (c)(1),
(2), (4) Date: Feb. 9, 2012

(87) PCT Pub. No.: WO2011/048770
PCT Pub. Date: Apr. 28, 2011

(65) Prior Publication Data
US 2012/0141354 A1    Jun. 7, 2012

(30) Foreign Application Priority Data

Oct. 20, 2009  (JP) ................................. 2009-241375
Nov. 16, 2009  (JP) ................................. 2009-261121

(51) Int. Cl.
*F27B 15/00*    (2006.01)
*F28C 3/10*    (2006.01)
(Continued)

(52) U.S. Cl.
CPC .............. *C04B 7/365* (2013.01); *F27D 17/001* (2013.01); *F27D 17/002* (2013.01)

(58) Field of Classification Search
CPC ........ Y02C 10/04; C04B 7/364; C04B 7/367; C04B 7/365; C04B 7/38; C04B 7/43; C04B 7/432; C04B 2/10; F27B 7/2033; F27B 7/02; F27B 7/20; F27B 7/38; F27B 7/2016; F27B 7/2041; F27B 7/32; F27B 7/34; F27B 17/00; F27B 9/02; F27B 9/028; F27B 9/2407; F27B 9/3005
USPC ......................................... 432/215, 117, 14, 1
See application file for complete search history.

(56) References Cited

U.S. PATENT DOCUMENTS

2010/0000446 A1   1/2010  Penfornis et al.
2011/0044880 A1   2/2011  Shima et al.

FOREIGN PATENT DOCUMENTS

JP   57 67013    4/1982
JP   9 110485    4/1997
(Continued)

OTHER PUBLICATIONS

Worrell, Ernst; Galtisky, Christina. "Energy Efficiency Improvement and Cost Saving opportunities for Cement Making". Environmental Energy Technologies Division. Mar. 2008 [Retrieved on Jan. 26, 2013]. Retrieved from http://www.energystar.gov/ia/business/industry/LBNL-54036.pdf?5d92-a6b3=.*
International Search Report Issued Jan. 11, 2011 in PCT/JP10/06047 Filed Oct. 12, 2010.
U.S. Appl. No. 14/074,750, filed Nov. 8, 2013, Shima, et al.

*Primary Examiner* — Kaj K Olsen
*Assistant Examiner* — Karam Hijji
(74) *Attorney, Agent, or Firm* — Oblon, McClelland, Maier & Neustadt, L.L.P.

(57) ABSTRACT

An object of the present invention is to separate $CO_2$ gas generated in a cement-manufacturing facility in a high concentration and recover the $CO_2$ gas. The present invention includes: feeding a cement material before calcination and a heat medium which has a particle diameter larger than that of the cement material and has been heated to the calcination temperature or higher in a medium-heating furnace (14), to a mixing calciner (12); and recovering the $CO_2$ gas generated by the calcination of the cement material. The heat medium circulates between the medium-heating furnace and the mixing calciner. Another aspect of the present invention includes: feeding a cement material before calcination to a regenerative calciner (112) which has been heated to the calcination temperature or higher and has stored heat therein; and recovering the $CO_2$ gas generated by the calcination of the cement material.

6 Claims, 14 Drawing Sheets

(51) Int. Cl.
*F26B 11/02* (2006.01)
*F27B 7/32* (2006.01)
*C04B 7/38* (2006.01)
*C04B 2/10* (2006.01)
*C04B 7/36* (2006.01)
*F27D 17/00* (2006.01)

(56) References Cited

FOREIGN PATENT DOCUMENTS

| WO | 2008 056068 | 5/2008 |
| WO | 2009 136485 | 11/2009 |
| WO | WO 2009136485 A1 * | 11/2009 |
| WO | WO 2009147000 A1 * | 12/2009 |

* cited by examiner

METHODS AND SYSTEMS FOR RECOVERY OF CO₂ GAS IN CEMENT-MANUFACTURING FACILITIES, AND PROCESSES FOR MANUFACTURING CEMENT

TECHNICAL FIELD

The present invention relates to methods and systems for recovering $CO_2$ gas in cement-manufacturing facilities, which recover $CO_2$ gas in a high concentration, which is generated mainly when a cement material is calcined, and processes for manufacturing the cement.

BACKGROUND ART

In recent years, attempts for reducing carbon dioxide ($CO_2$) gas which is the main cause of global warming are being promoted around the world and in all industrial fields.

Incidentally, the cement industry, together with the electric power industry, the steel industry and the like, is one of the industries in which a large amount of $CO_2$ gas is discharged, and the amount occupies approximately 4% of the total amount of $CO_2$ gas discharged in Japan. For this reason, reduction of the $CO_2$ gas discharged in the cement industry will result in largely contributing to the reduction of $CO_2$ gas discharged in the whole of Japan.

FIG. 16 illustrates a general cement-manufacturing facility in the above described cement industry. Reference numeral 1 in the figure denotes a rotary kiln (cement kiln) for burning a cement material.

In addition, in a kiln inlet part 2 in a left side of this rotary kiln 1 in the figure, 2 sets of preheaters 3 for preheating the cement material are provided in parallel, and also a main burner 5 for heating the inner part is provided in a kiln outlet part in a right side in the figure. In addition, reference numeral 6 in the figure denotes a clinker cooler for cooling a cement clinker which has been burned.

Here, each of the preheater 3 is configured by a plurality of stages of cyclones which are arranged in series in the vertical direction. The cement material which has been fed to the cyclone in the uppermost stage from a feed line 4 is preheated by a high-temperature exhaust gas which is sent from the rotary kiln 1 and ascends from the lower part, as the cement material falls down sequentially to the cyclones in the lower part, is extracted from the cyclone in the second stage from the bottom, is sent to a calciner 7, is heated and calcined by a burner 7a in the calciner 7, and is then introduced into the kiln inlet part 2 of the rotary kiln 1 from the cyclone in the lowermost stage through a transfer pipe 3a.

On the other hand, in the kiln inlet part 2, an exhaust gas pipe 3b is provided for feeding a combustion exhaust gas which has been discharged from the rotary kiln 1 to the cyclone in the lowermost stage. The above described exhaust gas which has been sent to the cyclone is sequentially sent to the cyclones in the upper part, preheats the above described cement material, and finally is exhausted by an exhaust fan 9 from the upper part of the cyclone in the uppermost stage through an exhaust line 8.

In the cement-manufacturing facility having such a structure, a cement clinker is manufactured by firstly preheating limestone ($CaCO_3$) contained as a main raw material of the cement material with the preheater 3, then calcining the limestone in the calciner 7 and the cyclone in the lowermost stage of the preheater 3, burning the calcined limestone in the rotary kiln 1 under an atmosphere in a high temperature of approximately 1,450° C.

In this calcination process, a chemical reaction occurs which is expressed by $CaCO_3 \rightarrow CaO + CO_2\uparrow$, and $CO_2$ gas is generated (generation of $CO_2$ gas originating in cement material). The concentration of the $CO_2$ gas originating in the cement material is theoretically 100%. In addition, $CO_2$ gas is generated also by the combustion of a fossil fuel (generation of $CO_2$ gas originating in fuel), as a result of the combustion of the fossil fuel in the main burner 5 in order to keep the atmosphere in the above described rotary kiln 1 at the above described high temperature. Here, the exhaust gas sent from the main burner 5 contains much $N_2$ gas in the air for combustion, and accordingly the concentration of $CO_2$ gas which originates in the fuel and is contained in the exhaust gas is as low as approximately 15%.

As a result, there coexist the above described $CO_2$ gas which has high concentration and originates in the cement material and the above described $CO_2$ which has low concentration and originates in the fuel, in the exhaust gas to be discharged from the above described cement kiln, and accordingly there has been a problem that though a large amount of the $CO_2$ is discharged, the concentration of the $CO_2$ is approximately 30 to 35% and the $CO_2$ gas is hard to be recovered.

On the other hand, though there are a liquid recovery method, a membrane separation method and a solid adsorption method in the methods for recovering $CO_2$ gas, which are being currently developed, any method has a problem that the recovering cost is still extremely high.

In addition, a method of separating/recovering $CO_2$ which has been discharged from a discharging source and is low concentration, increasing the concentration to approximately 100%, liquefying the $CO_2$ and then storing the liquefied $CO_2$ in the ground and the like have been proposed as methods for preventing global warming due to $CO_2$ discharged from the above described cement-manufacturing facilities, but have not been realized similarly to the above recovery methods because the cost for separating/recovering the $CO_2$ is high.

On the other hand, an apparatus for producing and recovering $CO_2$ gas has been proposed in the following Patent Literature 1 as an apparatus for recovering $CO_2$ gas generated in the step of burning the limestone as $CO_2$ gas having high utilization value and a high purity. The apparatus includes a decomposition reaction tower to which limestone is fed, a reheating tower to which quicklime (CaO) is fed as a heat medium and which also heats the quicklime to the calcination temperature of the limestone or higher with a combustion gas, and a connecting pipe which connects the decomposition reaction tower with the reheating tower.

In addition, the above described conventional recovering apparatus has such a structure as to feed the quicklime which has been heated in the reheating tower to the decomposition reaction tower through the connecting pipe to form a fluidized bed, burn the limestone thereby to produce $CO_2$ gas in the decomposition reaction tower, also discharge one part of thereby produced quicklime, send another part of the quicklime to the reheating tower through the connecting pipe again, and reheating the sent quicklime therein.

Thus, the above described apparatus for producing and recovering $CO_2$ gas can prevent $CO_2$ gas generated through the decomposition reaction of the limestone and the combustion exhaust gas generated due to heating of the heat medium from mixing with each other, by separating the decomposition reaction tower which is a place for conducting the decomposition reaction of the limestone therein from the reheating tower which is a place for generating heat quantity necessary for the decomposition reaction therein, and accordingly is considered to be capable of recovering $CO_2$ gas having high concentration from the decomposition reaction tower.

CITATION LIST

Patent Literature

Patent Literature 1: Japanese Patent Laid-Open No. 57-67013

SUMMARY OF INVENTION

If it is intended to manufacture cement by using CaO produced in the apparatus for producing and recovering the $CO_2$ gas disclosed in the above described Patent Literature 1, it is necessary to burn limestone in the above described producing and recovering apparatus, to further add another cement material such as clay which includes $SiO_2$, $Al_2O_3$ and $Fe_2O_3$ to the burned limestone, and to burn the mixture in a cement kiln. For this reason, it becomes necessary to mill the raw material in two lines independently, which causes a problem of requiring a large scale facility.

In addition, as is illustrated in FIG. 17, the temperature of causing the calcination reaction of the limestone generally rises rapidly as the concentration of the $CO_2$ gas in the atmosphere increases, and when the concentration of the $CO_2$ gas approaches 100% (equivalent to partial pressure of 1 atm under atmospheric pressure (1 atm)), the temperature reaches a temperature exceeding 860° C. For this reason, in order to increase the recovery rate of the $CO_2$ gas, it is necessary to heat the limestone to excessively high temperature, which causes a problem of causing a steep rise in a fuel cost.

In addition, the above described apparatus for producing and recovering the $CO_2$ gas uses the quicklime as a heat medium and heats the limestone by this quicklime to calcine the limestone, and accordingly needs to heat the above described quicklime to the calcination temperature of the limestone or higher, specifically, 1,000° C. or higher in the reheating tower. As a result, a powder such as the quicklime flowing in the decomposition reaction tower or in the reheating tower tends to be easily solidified, which causes also a problem of deposition and blockage in the connecting pipe or the like, and results in being unoperatable.

The present invention has been made in view of such circumstances, and an object is to provide methods and systems for recovering $CO_2$ gas in cement-manufacturing facilities, which can separate and recover $CO_2$ gas generated in the cement-manufacturing facilities in a high concentration by effectively using a heating source in the cement-manufacturing facilities, and processes for manufacturing the cement.

(1) First to Tenth Aspects of the Present Invention

In order to solve the above described objects, the first aspect of the present invention is a method for recovering $CO_2$ gas generated in a cement-manufacturing facility which preheats a cement material in a first preheater, then feeds the preheated cement material to a cement kiln having an atmosphere in an inner part held at high temperature and burns the fed cement material, includes: feeding the cement material before calcination, which has been extracted from the first preheater, to a mixing calciner; also heating a heat medium having a particle diameter larger than that of the cement material, to the calcination temperature or higher in a medium-heating furnace; then feeding the heat medium to the mixing calciner; calcining the cement material before calcination with the heat medium in the mixing calciner; then separating the cement material which has been calcined, from the heat medium; feeding the cement material which has been calcined, to the cement kiln; also returning the heat medium to the medium-heating furnace again and circulating the heat medium between the medium-heating furnace and the mixing calciner; and recovering the $CO_2$ gas generated by the calcination of the cement material in the mixing calciner.

For information, the above described calcination temperature means a temperature at which a reaction of decomposing limestone, in other words, $CaCO_3$ (calcium carbonate) into CaO (calcium oxide) and $CO_2$ occurs.

The second aspect of the present invention is the method for recovering the $CO_2$ gas according to the first aspect, wherein the heat medium is a cement clinker obtained by burning the cement material in the cement kiln.

The third aspect of the present invention is the method for recovering the $CO_2$ gas according to any one of the first and the second aspects, further including: feeding the cement material before calcination, which has been extracted from the first preheater, and another cement material before calcination, which has been preheated in a second preheater independent from the first preheater, to the mixing calciner; using the $CO_2$ gas generated in the mixing calciner as a heating source of the second preheater; and then recovering the resultant $CO_2$ gas.

The fourth aspect of the present invention is the method for recovering the $CO_2$ gas according to any one of the first to third aspects, further including: extracting the heat medium from the bottom part of the mixing calciner; returning the heat medium to the upper part of the mixing calciner; thereby bringing the heat medium into contact with the $CO_2$ gas discharged from the mixing calciner to separate the cement material which has deposited on the heat medium, from the heat medium; and then returning the resultant heat medium to the medium-heating furnace.

Furthermore, the fifth aspect of the present invention is the method for recovering the $CO_2$ gas according to any one of the first to fourth aspects, further including returning one part of the cement material which has been calcined in the mixing calciner to the first preheater.

In addition, the sixth aspect of the present invention is the method for recovering the $CO_2$ gas according to the fifth aspect, further including: heat-exchanging one part of the cement material with air and returning the cement material which has cooled to the first preheater; and also feeding the heated air as air for combustion in the medium-heating furnace.

Furthermore, the seventh aspect of the present invention is a process for manufacturing cement by preheating a cement material with a first preheater, feeding the preheated cement material to a cement kiln having the atmosphere in an inner part held at high temperature and firing the fed cement material therein, including recovering $CO_2$ gas generated by the calcination of the cement material, with the method for recovering $CO_2$ gas in the cement-manufacturing facility according to any one of the first to sixth aspects.

Subsequently, the eighth aspect of the present invention is a facility for recovering $CO_2$ gas generated in a cement-manufacturing facility which is provided with a first preheater for preheating a cement material and a cement kiln for burning the cement material that has been preheated in the first preheater, including: an extraction line for extracting a cement material before calcination from the first preheater; a mixing calciner to which the cement material that has been extracted from the extraction line is introduced; a medium-heating furnace for heating a heat medium having a particle diameter larger than that of the cement material, to the calcination temperature of the cement material or higher; a circulation line for feeding the heat medium which has been heated in the medium-heating furnace to the mixing calciner, and also returning the heat medium to the medium-heating furnace from the mixing calciner; a return line for returning the cement material which has been heated and calcined by the heat medium in the mixing calciner to the first preheater or the cement kiln; and a $CO_2$ gas exhaust pipe for recovering the $CO_2$ gas generated in the mixing calciner therethrough.

In addition, the ninth aspect of the present invention is the facility for recovering the $CO_2$ gas according to the eighth aspect, further including: a second preheater which is provided independently from the first preheater and preheats another cement material; and a transfer pipe for feeding the another cement material before calcination, which has been preheated in the second preheater, to the mixing calciner, wherein the $CO_2$ gas exhaust pipe connected to the mixing calciner is introduced as a heating source of the second preheater.

Furthermore, the tenth aspect of the present invention is the facility for recovering the $CO_2$ gas according to any one of the eighth and the ninth aspects, wherein the medium-heating furnace is a moving bed having a heating source in the lower part thereof.

In the recovery methods according to the first to sixth aspects, the process for manufacturing the cement according to the seventh aspect, and the recovery systems according to the eighth to tenth aspects of the present invention, the cement material before calcination, which has been extracted from the first preheater, is fed into the mixing calciner, and also the heat medium which has been heated to the calcination temperature of the cement material or higher in the medium-heating furnace is fed to the above described mixing calciner. Thereby, the above described cement material before calcination is calcined with the above described heat medium, in the above described mixing calciner.

As a result, the inner part of the above described mixing calciner is filled with $CO_2$ gas generated by the calcination of the cement material, and the concentration of the $CO_2$ gas becomes approximately 100%. Thus, the above described recovery method or recovery system can recover $CO_2$ gas which is discharged from the above described mixing calciner and has the concentration of approximately 100%, from the $CO_2$ gas exhaust pipe.

In addition, particularly in the above described third or ninth aspect, the high-temperature $CO_2$ gas which has been generated in the above described mixing calciner, is sent to the second preheater independent from the first preheater, is used for preheating the cement material, and then can be recovered in the as-is state from the exhaust gas pipe.

For information, the inner part of the above described mixing calciner becomes an atmosphere containing such a high concentration as nearly 100% of $CO_2$ gas, and accordingly the calcination temperature of the cement material becomes high. However, the cement material contains clay, silica stone and a raw material of iron oxide, in other words, $SiO_2$, $Al_2O_3$ and $Fe_2O_3$ together with the limestone ($CaCO_3$).

The above described cement material causes the reactions expressed by the following formulae in an atmosphere at a temperature of approximately 800 to 900° C.

reactions expressed by:

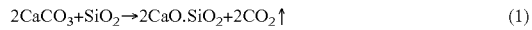   (1)

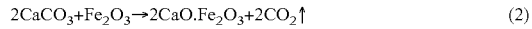   (2)

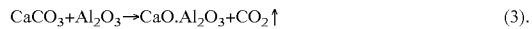   (3).

The components are eventually converted to alite ($3CaO.SiO_2$) and belite ($2CaO.SiO_2$) which are calcium silicate compounds constituting the cement clinker, and an aluminate phase ($3CaO.Al_2O_3$) and a ferrite phase ($4CaO.Al_2O_3.Fe_2O_3$) which are interstitial phases.

At this time, the above described reactions can be caused at lower temperatures even when the partial pressure of the $CO_2$ gas illustrated in a vertical axis becomes high, as is viewed in a graph of a reaction temperature of the above described formula (1) illustrated in FIG. 3, a graph of a reaction temperature of the above described formula (2) illustrated in FIG. 4 and a graph of a reaction temperature of the above described formula (3) illustrated in FIG. 5.

Furthermore, in the above described cement material, $SiO_2$, $Al_2O_3$, $Fe_2O_3$ and other trace components, which are brought from other raw materials than the limestone such as the silica stone and the clay, not only cause the reactions expressed by the above described formulae (1) to (3), but also function as a mineralizer, and promote thermal decomposition of calcium carbonate. Accordingly, both a start temperature and an end temperature of the thermal decomposition reaction are lowered in comparison with the case when calcium carbonate is solely calcined, as is illustrated in FIG. 6. Incidentally, FIG. 6 illustrates a result of having confirmed the transition of the above described thermal decomposition reaction from a change of weight obtained when a sample of the above described cement material (raw material) and a sample of the above described single limestone ($CaCO_3$) are heated respectively at a heating rate of 10 K/sec which is close to the heating rate in a general cement-manufacturing facility.

Here, the following is considered as one of the reasons why both the start temperature and the end temperature of the thermal decomposition reaction are lowered by the presence of the above described mineralizer, in comparison with the case in which the single calcium carbonate is calcined.

Specifically, when activity is represented by "a" and an equilibrium constant in a reaction formula of $CaCO_3=CaO+CO_2$ is represented by K, in the formula of $P_{CO2}=(a_{CaCO3}/a_{CaO})\cdot K$, the value of $a_{CaO}$ becomes less than 1, because an activity a of a solid is generally 1 regardless of the type of the solid as long as the solid is a pure substance, but in the case of calcium oxide (CaO), other source materials (in other words, the above described mineralizer) dissolve into CaO formed after the calcium carbonate ($CaCO_3$) has been thermally decomposed. It is considered that as a result, $P_{CO2}$ in the above formula becomes high, the temperature at which the $P_{CO2}$ becomes 1 atm is lowered, and the calcination is further promoted. For information, the $a_{CaCO3}$ is a value inherent to the type and producing district of the limestone, and is not affected by the other components in the raw material.

Because of the above description, the methods according to the present invention can secure a desired recovery amount of $CO_2$ gas, even when an operation temperature in the mixing calciner is lowered. Besides, the methods include heating and calcining the cement material in the mixing calciner, by using a heat medium which has a large particle diameter different from that of the cement material and accordingly has an extremely small specific surface area, accordingly suppress the sticking or fusion-bonding among the above described heat media or between the heat medium and a furnace wall or an inner wall of a chute even when the above described heat medium is heated to 1,000° C. which is the calcination temperature or higher in the medium-heating furnace, and can suppress the occurrence of a coating trouble and the like.

In addition, the uncalcined cement material to be introduced into the mixing calciner is preheated by the first preheater in the cement-manufacturing facility, in a similar process to a normal process of manufacturing a cement, and also the above described another cement material in the above described third or ninth aspect is preheated in the second preheater by the high-temperature $CO_2$ gas discharged from the mixing calciner.

Furthermore, the systems according to the present invention use the heat medium while circulating the heat medium between the mixing calciner and the medium-heating furnace, accordingly can secure a large heat quantity in the mixing calciner, and can selectively recover $CO_2$ in high concentration, which is generated during calcination and originates in the raw material, without adding a new thermal energy to the existing cement-manufacturing facility.

In addition, the systems include returning the high-temperature cement material which has been sufficiently calcined in the mixing calciner to the cement kiln, and accordingly can reduce fuel necessary for burning a cement material in the cement kiln. As a result, the systems can use a rotary kiln which has shorter longitudinal dimensions than those of conventional ones, a fluidized bed or a spouted bed as a cement kiln, and can also further save the space, the facility cost or the energy.

Furthermore, in the third or the ninth aspect of the present invention, the heat quantity generated when the $CO_2$ gas is generated is used for preheating the above described another cement material, and accordingly the thermal efficiency of the whole system can be further enhanced.

Here, the above described usable heat medium includes a cement clinker other than a ceramic material such as quicklime (CaO), silica stone ($SiO_2$) and alumina ($Al_2O_3$) which have heat resistance to heating temperature in the medium-heating furnace and abrasion resistance when having been mixed with the cement material, and a metallic material such as a heat-resistant alloy. Incidentally, the quicklime has advantages of having such a high melting point as 2,500° C., and of resisting being fusion-bonded. In addition, the quicklime does not cause a harmful effect even when the fine powder generated by being gradually worn out while being circulated as the heat medium is mixed into the raw material, because the fine powder is one of the components of the cement material. Furthermore, even when the limestone is charged into the mixing calciner, a heat-medium feed pipe or a bucket elevator in place of the quicklime, the limestone is decarbonized to be formed into the quicklime, and can show a similar functional effect to the case of the above described quicklime. At this time, when the above described limestone is charged into the mixing calciner or the heat-medium feed pipe, $CO_2$ generated during calcination can be recovered, which is preferable.

In addition, silica stone has advantages of having such a high melting point as 1,700° C. to resist being fusion-bonded, having an extremely high hardness to resist being worn out, and consequently requiring only a small amount of silica stone to be supplemented as the heat medium. Furthermore, the silica stone does not cause inconvenience even when the fine powder which has been generated by being gradually worn out in the circulation step is mixed into the raw material, because the fine powder is similarly one of the components of the cement material.

In addition, when a cement clinker which has been obtained by burning the calcined material in the above described cement kiln, is hard and has a particle diameter much larger than that of the cement material is used as in the second aspect of the present invention, the cost is economical, and the cement clinker also does not give adverse effect on the operation of the cement kiln and the quality of the cement as a product, even if having been brought into contact with the cement material and having been worn out, because the composition of the worn powder has been already adjusted, and the worn powder having the same quality as that of the cement material results in being sent to the cement kiln again.

In addition, when the heat medium and the cement material are mixed to each other in the mixing calciner and the heat is exchanged with each other, the cement material deposits on the surface of the heat medium having a particle diameter larger than that of the cement material. Then, as in the fourth aspect of the present invention, it is preferable to extract the above described heat medium once from the bottom part of the mixing calciner, return the heat medium to the upper part of the mixing calciner, thereby bring the above described heat medium into contact with the $CO_2$ gas discharged from the mixing calciner to separate the deposited cement material, and then return the heat medium to the above described medium-heating furnace.

By the way, a combustion exhaust gas which is sent to the first preheater from the cement kiln to preheat the cement material contains $N_2$ gas and also $CO_2$ gas (generated $CO_2$ gas originating in fuel) which has been generated as a result of the combustion of a fossil fuel.

Then, as in the fifth aspect of the present invention, if one part of the cement material containing much CaO by being calcined in the above described mixing calciner is returned to the first preheater, the above described CaO comes in contact with the combustion exhaust gas, causes a chemical reaction expressed by $CaO+CO_2 \rightarrow CaCO_3$, and can adsorb the $CO_2$ gas originating in the fuel in the above described exhaust gas.

Thus produced $CaCO_3$ is sent to the mixing calciner again together with the cement material and is calcined there.

Because of this, it becomes possible to recover also the $CO_2$ gas originating in the fuel in addition to the $CO_2$ gas which is generated when the cement material is calcined and originates in the cement material.

Here, the calcined cement material which has been discharged from the mixing calciner has high temperature, and the above described reaction of $CaO+CO_2 \rightarrow CaCO_3$ is an exothermic reaction. Because of this, it is preferable as in the sixth aspect of the present invention to heat-exchange one part of the above described cement material which has been discharged from the mixing calciner with air once, lower the temperature of the cement material, then return the cooled cement material to the above described first preheater, and on the other hand, to feed the above described heated air as air for combustion in the medium-heating furnace, because thermal energy in the system can be further effectively used.

Furthermore, in the tenth aspect of the present invention, a movable tank having a heating source in the lower part thereof is used as the above described medium-heating furnace. Because of this, a heating gas such as a combustion gas flows towards the upper part of the moving bed from the bottom part thereof, and thereby the above described heat medium in the bottom part becomes the highest temperature. Then, by feeding the heat medium from the above described bottom part of the moving bed sequentially to the mixing calciner, a thermal energy necessary for heating can be reduced compared to the case in which the whole heat medium in the medium-heating furnace is heated to a desired temperature. In addition, because the heating gas is brought into contact with the heat medium of approximately 900° C. which has been discharged from the mixing calciner in the upper part of the furnace and is heat-exchanged with the heat medium, the gas temperature to be discharged can be lowered to approximately 1,000° C.

(2) Eleventh to Twenty Second Aspects of the Present Invention

Furthermore, in order to solve the above described problems, the eleventh aspect of the present invention is a method for recovering $CO_2$ gas generated in a cement-manufacturing facility which preheats a cement material in a first preheater, then feeds the preheated cement material to a cement kiln having an atmosphere in an inner part held at high temperature and burns the fed cement material, including: feeding the cement material before calcination, which has been extracted from the first preheater, to a regenerative calciner which has been heated to the calcination temperature or higher and has stored heat therein, and calcining the fed cement material therein; feeding the cement material which has been calcined, to the cement kiln; and also recovering $CO_2$ gas generated by the calcination of the cement material in the regenerative calciner.

The above described calcination temperature means a temperature at which a reaction occurs through which limestone, in other words, $CaCO_3$ (calcium carbonate) is decomposed into CaO (calcium oxide) and $CO_2$.

In addition, the twelfth aspect of the present invention is the method for recovering $CO_2$ gas according to the eleventh aspect, further including: providing the plurality of the regenerative calciners; heating at least one of the regenerative calciners to the calcination temperature or higher to store heat therein, while at least one of the other regenerative calciners calcines the cement material; alternately repeating the calcination and heat storage in the plurality of the regenerative calciners; and thereby recovering the $CO_2$ gas generated by the calcination of the cement material.

The thirteenth aspect of the present invention is the method for recovering $CO_2$ gas according to any one of the eleventh and the twelfth aspects, further including filling the regenerative calciner with a heat medium having a larger particle diameter than that of the cement material.

Furthermore, the fourteenth aspect of the present invention is the method for recovering $CO_2$ gas according to the thirteenth aspect, wherein the heat medium is any one of a cement clinker obtained by burning the raw material in the cement kiln, silica stone or quicklime.

In addition, the fifteenth aspect of the present invention is the method for recovering the $CO_2$ gas according to any one of the eleventh to fourteenth aspects, further including: feeding the cement material before calcination, which has been extracted from the first preheater, and another cement material before calcination, which has been preheated in a second preheater independent from the first preheater, to the regenerative calciner; using $CO_2$ gas generated in the regenerative calciner as a heating source of the second preheater; and then recovering the resultant $CO_2$ gas.

The sixteenth aspect of the present invention is the method for recovering the $CO_2$ gas according to any one of the eleventh to fifteenth aspects, further including: fluidizing the cement material with $CO_2$ gas generated when the cement material is fed to the regenerative calciner and is calcined therein; thereby making the cement material which has been calcined overflow from the regenerative calciner; and feeding the overflowing cement material to the cement kiln.

Furthermore, the seventeenth aspect of the present invention is the method for recovering the $CO_2$ gas according to any one of the eleventh to fifteenth aspects, further including: making $CO_2$ gas generated when the cement material is fed to the regenerative calciner and is calcined therein entrain the cement material; separating the cement material from the $CO_2$ gas with particle-separating means; and feeding the cement material which has been calcined, to the cement kiln.

In addition, the eighteenth aspect of the present invention is the method for recovering the $CO_2$ gas according to any one of the eleventh to seventeenth aspects, further including: returning one part of the cement material which has been calcined in the regenerative calciner to the first preheater.

The nineteenth aspect of the present invention is the method for recovering the $CO_2$ gas according to the eighteenth aspect, further including: heat-exchanging one part of the cement material with air; returning the cement material which has cooled to the first preheater; and feeding the heated air as air for combustion in the regenerative calciner.

Furthermore, the twentieth aspect of the present invention is a facility for recovering $CO_2$ gas generated in a cement-manufacturing facility provided with a first preheater for preheating a cement material and a cement kiln for burning the cement material which has been preheated in the first preheater, including: an extraction line for extracting the cement material before calcination from the first preheater; a regenerative calciner to which the cement material that has been extracted from the extraction line is introduced and which heats the cement material to the calcination temperature of the cement material or higher and stores heat therein; a return line for returning one part of the cement material which has been calcined in the regenerative calciner, to the first preheater or the cement kiln; and a $CO_2$ gas exhaust pipe through which the $CO_2$ gas generated in the regenerative calciner is recovered.

In addition, the twenty first aspect of the present invention is the facility for recovering the $CO_2$ gas according to the twentieth aspect, further including: a second preheater which is provided independently from the first preheater and preheats another cement material; and a transfer pipe for feeding the another cement material before calcination, which has been preheated in the second preheater, to the regenerative calciner therethrough, wherein the $CO_2$ gas sent from the regenerative calciner is introduced as a heating source of the second preheater.

The twenty second aspect of the present invention is the facility for recovering the $CO_2$ gas according to the twentieth aspect or the twenty first aspect, wherein the facility for recovering the $CO_2$ gas has the plurality of the regenerative calciners provided therein.

In the above described recovery methods of the eleventh to nineteenth aspects and the above described recovery systems of the twentieth to the twenty second aspects of the present invention, the cement material before calcination, which has been extracted from the first preheater, is fed to the regenerative calciner which heats the charged heat medium to the calcination temperature or higher and stores heat therein. Thereby, in the above described regenerative calciner, the above described cement material before calcination is calcined by the above described heat medium.

As a result, the inner part of the above described regenerative calciner is filled with $CO_2$ gas generated by the calcination of the cement material, and the concentration of the $CO_2$ gas becomes approximately 100%. Thus, the above described recovery method or recovery system can recover the $CO_2$ gas which is discharged from the above described regenerative calciner and has the concentration of approximately 100%, from the $CO_2$ gas exhaust pipe.

Furthermore, in the twelfth aspect of the present invention, the cement material before calcination, which has been extracted from the first preheater, is calcined with the use of the plurality of the regenerative calciners, and accordingly the calciner and the medium-heating furnace can be integrated. For this reason, it becomes unnecessary to take out the high-temperature heat medium from the medium-heating furnace.

As a result, it is possible to reduce a cost for the facility because of having no need to provide a facility such as a bucket elevator, and it is also possible to suppress a problem of handling of a high-temperature substance as much as possible and a heat loss because of not transferring the heat medium. Furthermore, the twelfth aspect includes using the above described plurality of the regenerative calciners, accordingly can shorten a period of time for heating the medium and a period of time for calcination, and can efficiently recover the $CO_2$ gas.

In addition, particularly in the fifteenth aspect or the twenty first aspect of the present invention, the high-temperature $CO_2$ gas which has been generated in the above described regenerative calciner is sent to the second preheater independent from the first preheater, is used for preheating the cement material, and then can be recovered entirely in the as-is state from the exhaust gas pipe.

The inner part of the above described regenerative calciner becomes an atmosphere containing such a high concentration as nearly 100% of $CO_2$ gas, and accordingly the calcination temperature of the cement material becomes high. However, the cement material contains clay, silica stone and a raw material of iron oxide, in other words, $SiO_2$, $Al_2O_3$ and $Fe_2O_3$ together with the limestone ($CaCo_3$).

Then, the above described cement material causes the reactions expressed by the following formulae in an atmosphere at approximately 800 to 900° C.

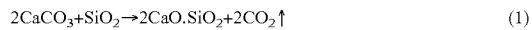
$$2CaCO_3 + SiO_2 \rightarrow 2CaO.SiO_2 + 2CO_2\uparrow \quad (1)$$

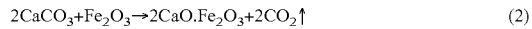
$$2CaCO_3 + Fe_2O_3 \rightarrow 2CaO.Fe_2O_3 + 2CO_2\uparrow \quad (2)$$

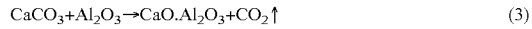
$$CaCO_3 + Al_2O_3 \rightarrow CaO.Al_2O_3 + CO_2\uparrow \quad (3)$$

The components are eventually converted to alite ($3CaO.SiO_2$) and belite ($2CaO.SiO_2$) which are calcium silicate compounds constituting the cement clinker, and an aluminate phase ($3CaO.Al_2O_3$) and a ferrite phase ($4CaO.Al_2O_3.Fe_2O_3$) which are interstitial phases.

At this time, the above described reactions can be caused at lower temperatures even when the partial pressure of the $CO_2$ gas viewed in a vertical axis becomes high, as illustrated in a graph of a reaction temperature of the above described formula (1) illustrated in FIG. 12, a graph of a reaction temperature of the above described formula (2) illustrated in FIG. 13 and a graph of a reaction temperature of the above described formula (3) illustrated in FIG. 14.

Furthermore, in the above described cement material, $SiO_2$, $Al_2O_3$ and $Fe_2O_3$ which are brought from other raw materials than the limestone such as the silica stone and the clay, and other trace components not only cause the reactions expressed by the above described formulae (1) to (3), but also function as a mineralizer, and promote thermal decomposition of calcium carbonate. Accordingly, both a start temperature and an end temperature of the thermal decomposition reaction are lowered in comparison with the case when calcium carbonate is solely calcined, as is illustrated in FIG. 15. Incidentally, FIG. 15 illustrates a result of having confirmed the transition of the above described thermal decomposition reaction, from a change of weight obtained when a sample of the above described cement material (raw material) and a sample of the above described single limestone ($CaCO_3$) are heated respectively at a heating rate of 10 K/sec close to the heating rate which is generally adopted in a general cement-manufacturing facility.

Here, the following is considered as one of the reasons why both the start temperature and the end temperature of the thermal decomposition reaction are lowered by the presence of the above described mineralizer, in comparison with the case in which the single calcium carbonate is calcined.

Specifically, when activity is represented by "a" and an equilibrium constant in a reaction formula of $CaCO_3 \rightarrow CaO + CO_2$ is represented by K, in the formula of $P_{CO2} = (a_{CaCO3}/a_{CaO})/K$ the value of $a_{CaO}$ becomes less than 1, because an activity a of a solid is generally 1 regardless of the type of the solid as long as the solid is a pure substance, but in the case of calcium oxide (CaO), other source materials (in other words, the above described mineralizer) dissolve into CaO formed after the calcium carbonate ($CaCO_3$) has been thermally decomposed. It is considered that as a result, $P_{CO2}$ in the above formula becomes high, the temperature at which the $P_{CO2}$ becomes 1 atm is lowered, and the calcination is further promoted. For information, the $a_{CaCO3}$ is a value inherent to the type and producing district of the limestone, and is not affected by the other components in the raw material.

Because of the above description, the methods according to the present invention can secure a desired recovery amount of $CO_2$ gas, even when an operation temperature in the regenerative calciner is lowered. Besides, the methods include heating and calcining the cement material in the above described regenerative calciner, by using a heat medium which has a large particle diameter different from that of the cement material and accordingly has an extremely small specific surface area, accordingly suppress the sticking or fusion-bonding among the above described heat media or between the heat medium and a furnace wall even when the above described heat medium is heated to 1,000° C. which is the calcination temperature or higher in the regenerative calciner, and can suppress the occurrence of a coating trouble and the like.

In addition, the cement material before calcination to be introduced into the above described regenerative calciner is preheated by the first preheater in the cement-manufacturing facility, in a similar process to a normal process of manufacturing a cement, and also the above described another cement material in the fifteenth aspect or twenty first aspect of the present invention is preheated in the second preheater by the high-temperature $CO_2$ gas discharged from the regenerative calciner.

As in the thirteenth aspect of the present invention, the method for recovering the $CO_2$ gas includes filling the above described regenerative calciner with a heat medium having a particle diameter larger than that of the above described cement material, accordingly can secure a large heat quantity in the above described regenerative calciner, and can selectively recover $CO_2$ in a high concentration, which is generated during calcination and originates in the cement material, without adding a new thermal energy to the existing cement-manufacturing facility.

In addition, the method for recovering the $CO_2$ gas includes returning the high-temperature cement material which has been sufficiently calcined in the regenerative calciner to the cement kiln, and accordingly can reduce the fuel necessary for firing the cement material in the cement kiln. As a result, the method can use a rotary kiln which is shorter than a conventional one as a cement kiln, or alternatively can use a fluidized bed.

In addition, in the fifteenth aspect or the twenty first aspect of the present invention, the heat quantity possessed by the generated $CO_2$ gas is used for preheating the above described another cement material, and accordingly the thermal efficiency of the whole system can be further enhanced.

Here, as in the fourteenth aspect, the above described usable heat medium includes a cement clinker other than a ceramic material such as quicklime (CaO), silica stone ($SiO_2$) and alumina ($Al_2O_3$) which have heat resistance to a heating temperature in the above described regenerative calciner and abrasion resistance when having been mixed with the cement material, and a metallic material such as a heat-resistant alloy. Incidentally, the quicklime has advantages of having such a high melting point as 2,500° C., and of resisting being fusion-bonded. In addition, the quicklime does not cause a harmful effect even when the fine powder is mixed into the raw material, which has been generated by being gradually worn out while the quicklime is repeatedly used for calcining the above described cement material in the above described regenerative calciner as the heat medium, because the fine powder is one of the components of the cement material. Furthermore, even when the limestone is charged into the above described regenerative calciner in place of the quicklime, the limestone is decarbonized to be formed into the quicklime, and can show a similar functional effect to the case of the above described quicklime.

In addition, silica stone has advantages of having such a high melting point as 1,700° C. to resist being fusion-bonded, having an extremely high hardness to resist being worn out, and consequently requiring only a small amount of silica stone to be supplemented as the heat medium. Furthermore, the silica stone does not cause inconvenience even when the fine powder which has been generated by being gradually worn out in the calcination process is mixed into the raw material, because the fine powder is one of the components of the cement material.

In addition, when a cement clinker which has been obtained by burning the calcined material in the above described cement kiln, is hard and has a particle diameter much larger than that of the cement material is used as in the fourteenth aspect of the present invention, the cost is economical, and the cement clinker also does not give adverse effect on the operation and the quality of the cement kiln as a product, even if having been brought into contact with the cement material and having been worn out, because the composition of the worn powder has been already adjusted, and the worn powder having the same quality as that of the cement material results in being sent to the cement kiln again.

Furthermore, when the heat medium and the cement material are mixed to each other in the regenerative calciner and the heat is exchanged with each other, the cement material deposits on the surface of the heat medium having a particle diameter larger than that of the cement material. Then, as in the sixteenth aspect, the method for recovering the $CO_2$ gas fluidizes the above described cement material by $CO_2$ gas generated when the above described cement material is fed to the above described regenerative calciner and is calcined, thereby makes the above described cement material which has been calcined overflow from the above described regenerative calciner, and accordingly can feed the overflowing cement material to the above described cement kiln. As a result, the above described cement material which has been calcined can be simply taken out from the regenerative calciner.

In addition, as in the seventeenth aspect of the present invention, the method for recovering the $CO_2$ gas makes $CO_2$ gas generated when the above described cement material is fed to the above described regenerative calciner and is calcined therein entrain the above described cement material, separates the above described cement material from the $CO_2$ gas with particle-separating means, and can feed the above described cement material which has been calcined to the above described cement kiln. Thereby, the above described cement material which has been calcined can be simply taken out from the regenerative calciner.

By the way, a combustion gas which is sent to the first preheater from the cement kiln to preheat the cement material contains $N_2$ gas and also $CO_2$ gas (generated $CO_2$ gas originating in fuel) which has been generated as a result of the combustion of a fossil fuel.

Then, as in the eighteenth aspect, if one part of the cement material containing much CaO by being calcined in the above described regenerative calciner is returned to the first preheater, the above described CaO comes in contact with the combustion exhaust gas, causes a chemical reaction expressed by $CaO+CO_2 \rightarrow CaCO_3$, and can adsorb the $CO_2$ gas originating in the fuel in the above described exhaust gas.

Thus produced $CaCO_3$ is sent to the regenerative calciner again together with the cement material and is calcined there.

Because of this, it becomes possible to recover the $CO_2$ gas originating in the fuel in addition to the $CO_2$ gas which is generated when the cement material is calcined and originates in the cement material.

Here, the calcined cement material which has been discharged from the above described regenerative calciner has high temperature, and the above described reaction of $CaO+CO_2 \rightarrow CaCO_3$ is an exothermic reaction. Because of this, it is preferable as in the nineteenth aspect to heat-exchange one part of the above described cement material which has been discharged from the above described regenerative calciner with air once, lower the temperature of the cement material, then return the cooled cement material to the above described first preheater, and on the other hand, to feed the above described heated air as air for combustion in the above described regenerative calciner, because thermal energy in the system can be further effectively used.

Furthermore, as in the twenty second aspect, the recovery system for recovering the $CO_2$ gas has the plurality of the above described regenerative calciners provided therein, accordingly can heat the above described heat medium to the calcination temperature or higher and can store heat therein in at least one regenerative calciner, when the above described cement material before calcination is calcined in at least another regenerative calciner, repeatedly heats and stores heat therein alternately or according to a predetermined rotation, and thereby can continuously calcine the above described cement material before calcination.

DESCRIPTION OF EMBODIMENTS

First Embodiment

Figure 1:
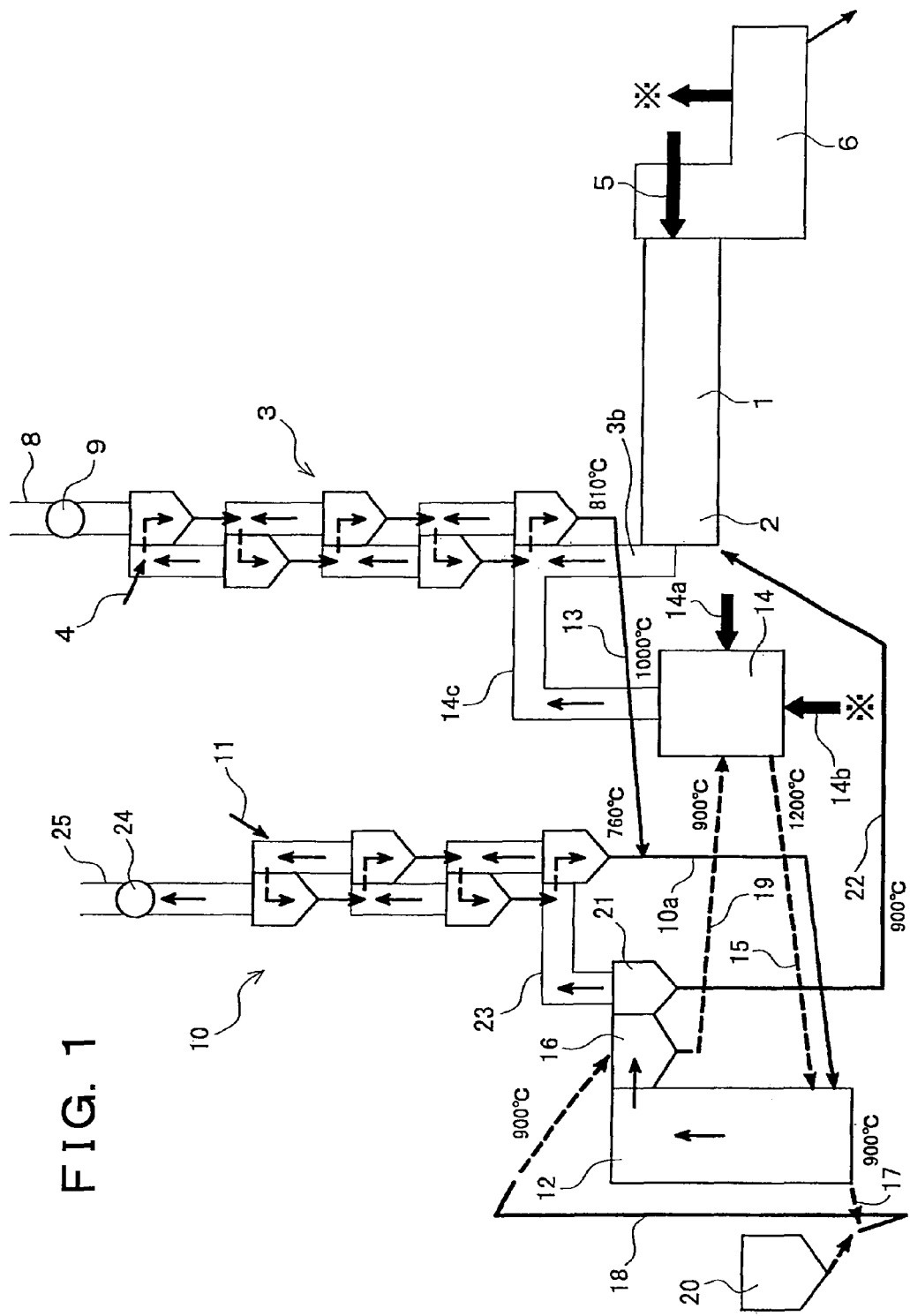
FIG. 1 is a schematic block diagram illustrating a first embodiment of the systems for recovering the $CO_2$ gas according to the present invention.
Figure 16:
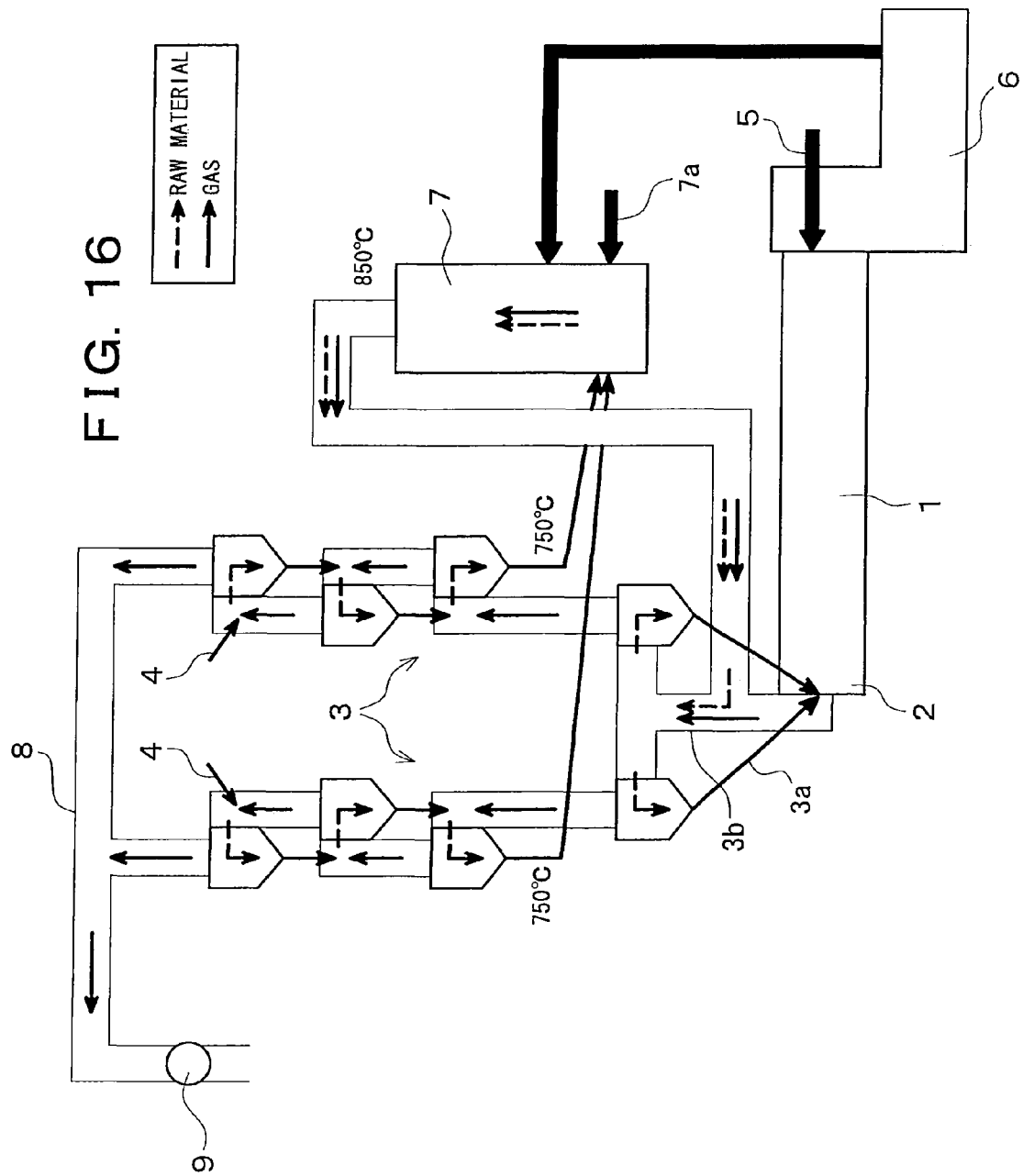
FIG. 16 is a schematic block diagram illustrating a general cement-manufacturing facility.
Figure 17:
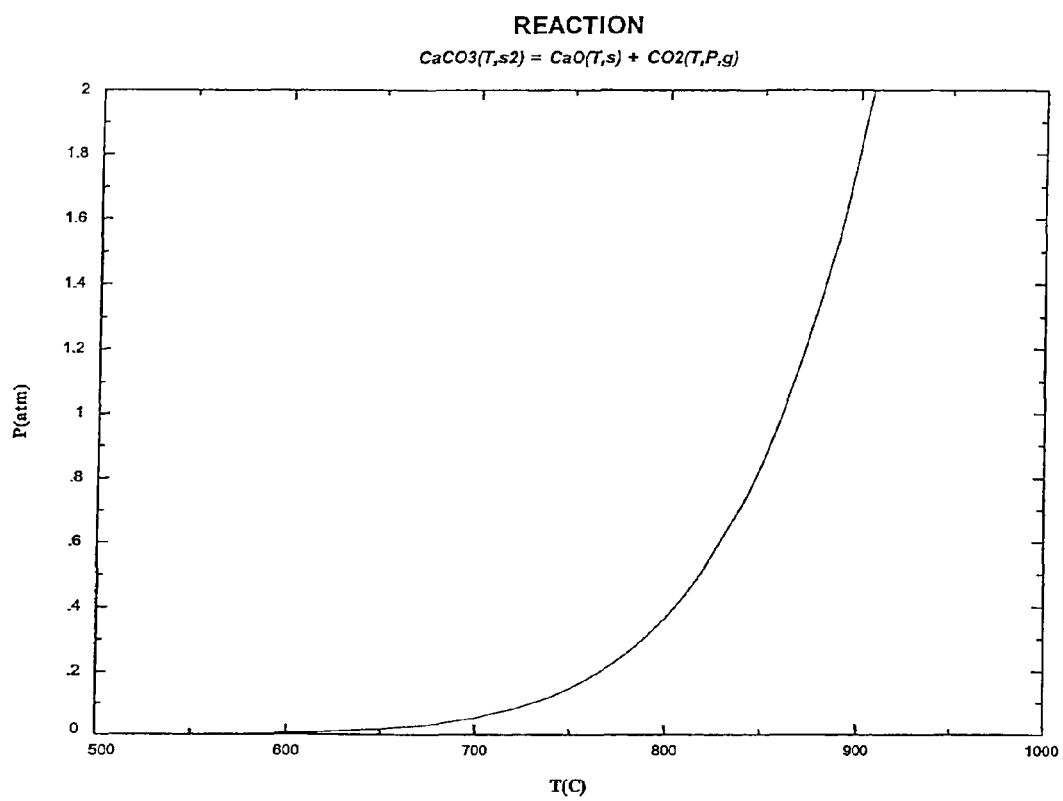
FIG. 17 is a graph illustrating a relationship between the concentration of $CO_2$ in an atmosphere and a calcination temperature of limestone.

FIG. 1 illustrates a first embodiment of systems for recovering $CO_2$ gas in cement-manufacturing facilities according to the present invention, and the first embodiment has the same structure concerning the cement-manufacturing facility as that in FIG. 16. Accordingly, the same portions are denoted by the same reference numerals, and the description thereof will be simplified.

In FIG. 1, reference numeral 10 denotes a second preheater which is provided independently from the preheater (first preheater) 3 in the cement-manufacturing facility.

This second preheater 10 is constituted by a plurality of stages of cyclones which are serially arranged in a vertical direction similarly to the above described preheater 3, and is constituted so that the cement material is fed to the cyclone in the uppermost stage from a feed line 11. The upper end of a transfer pipe 10a is connected to the bottom part of the cyclone in the lowermost stage of the second preheater 10, and the lower end of this transfer pipe 10a is introduced to a mixing calciner 12. This mixing calciner 12 is, for instance, a powder-mixing furnace such as a fluidized-bed type, a rotary kiln type and a moving-bed type.

On the other hand, the above described preheater 3 of the cement-manufacturing facility has an extraction line 13 for extracting a cement material before calcination from the cyclone in the lowermost stage, and the head part of this extraction line 13 is connected to the transfer pipe 10a connected to the second preheater 10. Thus, the cement material before calcination sent from the second preheater 10 and the cement material before calcination sent from the preheater 3 are introduced into the mixing calciner 12.

Furthermore, this system for recovering the $CO_2$ gas has a medium-heating furnace 14 provided in parallel to the mixing calciner 12 therein. This medium-heating furnace 14 is a moving bed which is filled with a cement clinker that has been discharged from the clinker cooler 6 and has a particle diameter larger than that of the cement material, and has a burner 14a for heating the inner part thereof provided on the side face in the lower part thereof. In addition, an introduction pipe 14b for introducing a bleed gas sent from the clinker cooler 6 as air for combustion is provided in the bottom part. Furthermore, an exhaust gas pipe 14c for exhausting a combustion exhaust gas in the inner part is provided in the ceiling part of this medium-heating furnace 14, and this exhaust gas pipe 14c is connected to the exhaust gas pipe 3b which is connected to the rotary kiln 1. This medium-heating furnace 14 is not limited to a moving-bed type, and alternatively can employ, for instance, a powder-heating furnace such as a fluidized-bed type and a rotary kiln type.

A heat-medium feed pipe 15 for sending the cement clinker which has been heated in the inner part to the mixing calciner 12 is connected to the lower part of this medium-heating furnace 14, and a medium sedimentation device 16 which constitutes one part of an exhaust duct from the mixing calciner 12 is connected to the upper part of this mixing calciner 12. In addition, a discharge pipe 17 for extracting the cement clinker is connected to the bottom part of the mixing calciner 12, and the cement clinker which has been extracted through this discharge pipe 17 is returned into the above described medium sedimentation device 16 through a bucket elevator 18.

Furthermore, a heat-medium return pipe 19 for returning the above described cement clinker to the medium-heating furnace 14 is connected to the bottom part of the medium sedimentation device 16. The heat-medium feed pipe 15, the discharge pipe 17, the bucket elevator 18 and the heat-medium return pipe 19 constitute a circulation line of the heat medium, which feeds the cement clinker that has been heated in the medium-heating furnace 14 to the mixing calciner 12 and also returns the cement clinker to the medium-heating furnace 14 from the mixing calciner 12. Reference numeral 20 in the figure denotes a clinker tank for supplementing a new cement clinker so as to compensate the worn quantity of the cement clinker to be circulated through this circulation line.

On the other hand, a cyclone 21 is connected to the discharge side of the medium sedimentation device 16, so as to separate the $CO_2$ gas discharged from the mixing calciner 12, from the calcined cement material entrained by this $CO_2$ gas and the calcined cement material which has been separated from the heat medium in the medium sedimentation device 16, and a return line 22 for returning the calcined and separated cement material to the kiln inlet part 2 of the rotary kiln 1 is connected to the bottom part of this cyclone 21. In addition, a $CO_2$ exhaust pipe 23 for discharging the separated $CO_2$ gas is connected to the upper part of the cyclone 21, and this $CO_2$ exhaust pipe 23 is also introduced as a heating medium in the second preheater 10. Here, reference numeral 24 in the figure denotes an exhaust fan of $CO_2$ gas, and reference numeral 25 denotes an exhaust line of $CO_2$ gas.

Next, one embodiment of the methods for recovering the $CO_2$ gas and the processes for manufacturing the cement according to the present invention using the above described system for recovering of the $CO_2$ gas shown in the first embodiment will be described below.

Firstly, a cement material is fed to the cyclones in the uppermost stages of the preheater 3 and the second preheater 10 from the feed pipes 4 and 11, respectively.

Then, the above described cement material is preheated by the exhaust gas which is fed from the rotary kiln 1 through the exhaust gas pipe 3b, in the process of being sequentially sent to the cyclones in the lower part in the preheater 3, in a similar way to that in a conventional process. Then, the above described cement material which has been preheated up to a temperature (for instance, approximately 810° C.) just below the calcination temperature is fed to the mixing calciner 12 from the extraction line 13 through the transfer pipe 10a.

The cement material which has been fed to the second preheater 10 is preheated by a high-concentration and high-temperature $CO_2$ gas which has been discharged from the mixing calciner 12, is preheated up to a temperature (for instance, approximately 760° C.) before finally reaching the calcination temperature, and is fed to the mixing calciner 12 from the transfer pipe 10a.

On the other hand, in the medium-heating furnace 14, the cement clinker (heat medium) in the inner part is heated to the calcination temperature of the cement material or higher (for instance, approximately 1,200° C.) by the combustion of the burner 14a. Then, the heated cement clinker is fed to the mixing calciner 12 from the heat-medium feed pipe 15.

Thus, in the mixing calciner 12, the fed cement material is mixed with the cement clinker and is heated to the calcination temperature or higher (for instance, approximately 900° C.) and is calcined. At this time, $CO_2$ gas is also generated. Then, this $CO_2$ gas and the calcined cement material are sent to the cyclone 21 from the upper part of the mixing calciner 12 through the medium sedimentation device 16, and are separated from each other in the cyclone 21. Then, the calcined and separated cement material is returned to the kiln inlet part 2 of the rotary kiln 1 from a return line 22, and is finally burned in the rotary kiln 1.

On the other hand, the high-temperature $CO_2$ which has been separated by the cyclone 21 and has a concentration of approximately 100% is introduced to the second preheater 10 from the $CO_2$ exhaust pipe 23 as a heating medium. As a result, the $CO_2$ gas which originates in the cement material and has the concentration of approximately 100% can be recovered from the exhaust line 25 of the $CO_2$ gas.

In addition, at the same time, the cement clinker which has lowered its temperature by calcining the cement material in the mixing calciner 12 is sequentially extracted from the bottom part of the mixing calciner 12 through the discharge pipe 17, is transported to the upper part of the mixing calciner 12 by the bucket elevator 18, and is charged into the medium sedimentation device 16. Then, in this medium sedimentation device 16, the cement clinker is separated from the cement material which has deposited thereon, by $CO_2$ gas that is sent from the mixing calciner 12, and then the resultant cement clinker is returned to the medium-heating furnace 14 through the heat-medium return pipe 19 again.

Thus, the above described method and system for recovering the $CO_2$ gas in the cement-manufacturing facility effectively use a heating source in the cement-manufacturing facility, and can recover $CO_2$ gas which originates in the cement material and occupies a half or more of the $CO_2$ gas generated in the cement-manufacturing facility, in a high concentration of nearly 100%.

At this time, because the cement material is heated and calcined by using the cement clinker which has a large particle diameter different from that of the cement material and accordingly has an extremely small specific surface area as a heat medium in the mixing calciner 12, the sticking or fusion-bonding among the above described cement clinkers or between the cement clinker and a furnace wall or an inner wall of a chute are suppressed even when the above described cement clinker is heated to 1,000° C. which is the calcination temperature or higher in the medium-heating furnace 14, and the occurrence of a coating trouble and the like can be suppressed.

In addition, the method and system return the high-temperature cement material which has been sufficiently calcined in the mixing calciner 12 to the rotary kiln 1 from the return line 22, and accordingly can reduce the fuel necessary for burning a cement material in the rotary kiln 1. As a result, the cement manufacturing facility can use a rotary kiln 1 which has a shorter longitudinal dimension than that of a conventional one.

Second Embodiment

Figure 2:
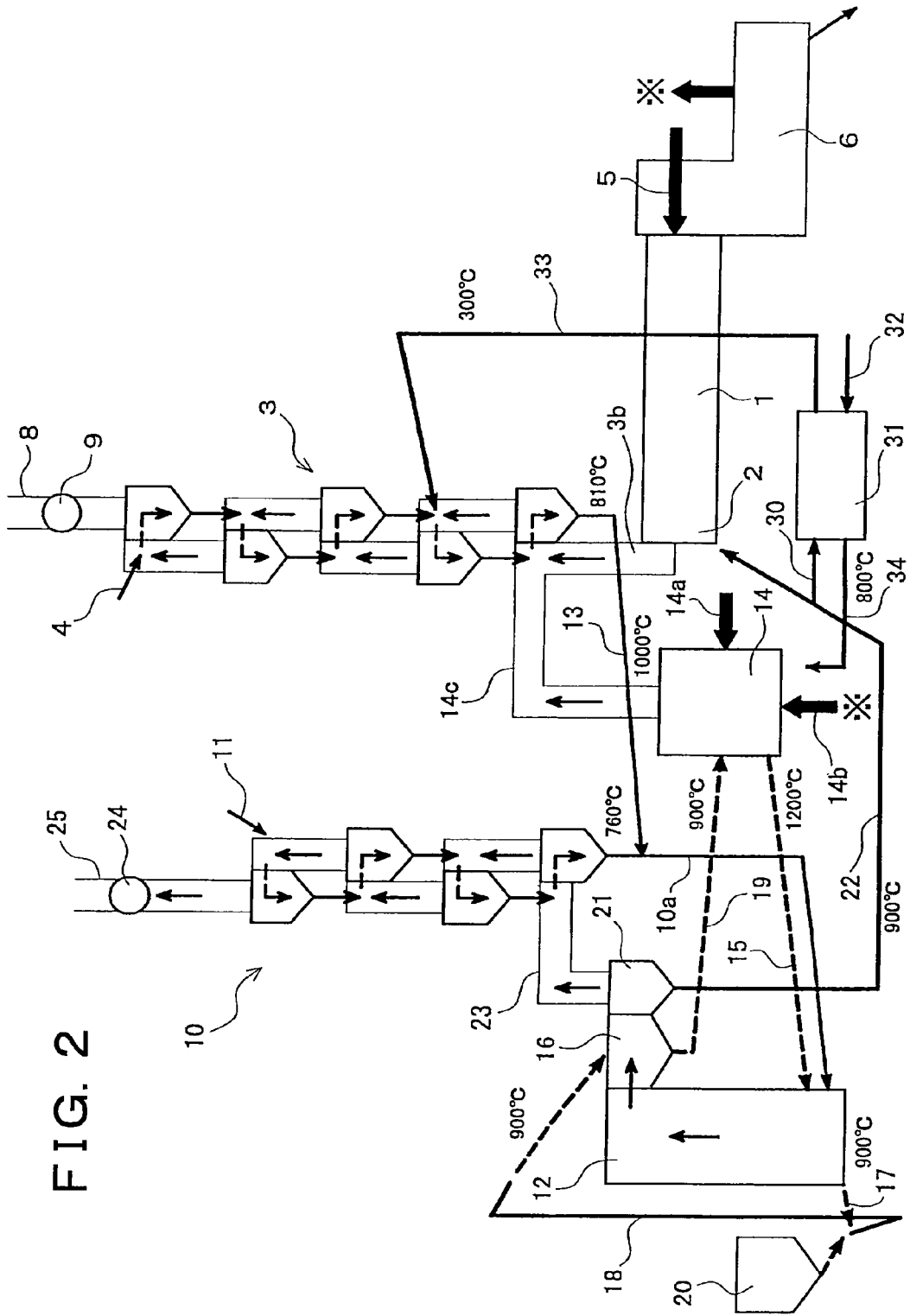
FIG. 2 is a schematic block diagram illustrating a second embodiment of the systems for recovering the $CO_2$ gas according to the present invention.
Figure 3:
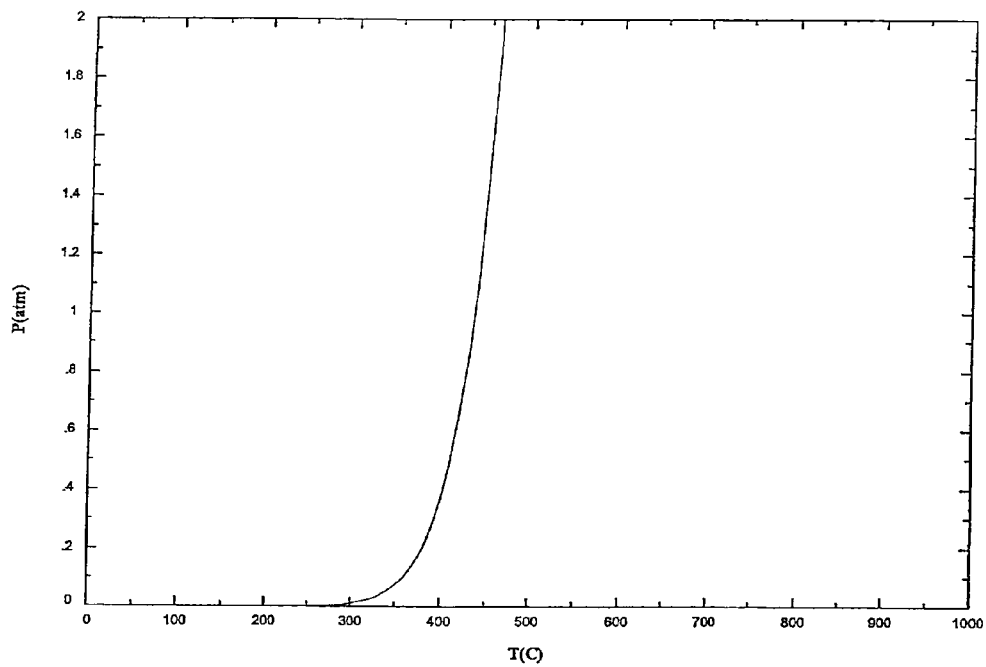
FIG. 3 is a graph illustrating a relationship between the concentration of $CO_2$ in an atmosphere and a reaction temperature expressed by formula (1).
Figure 4:
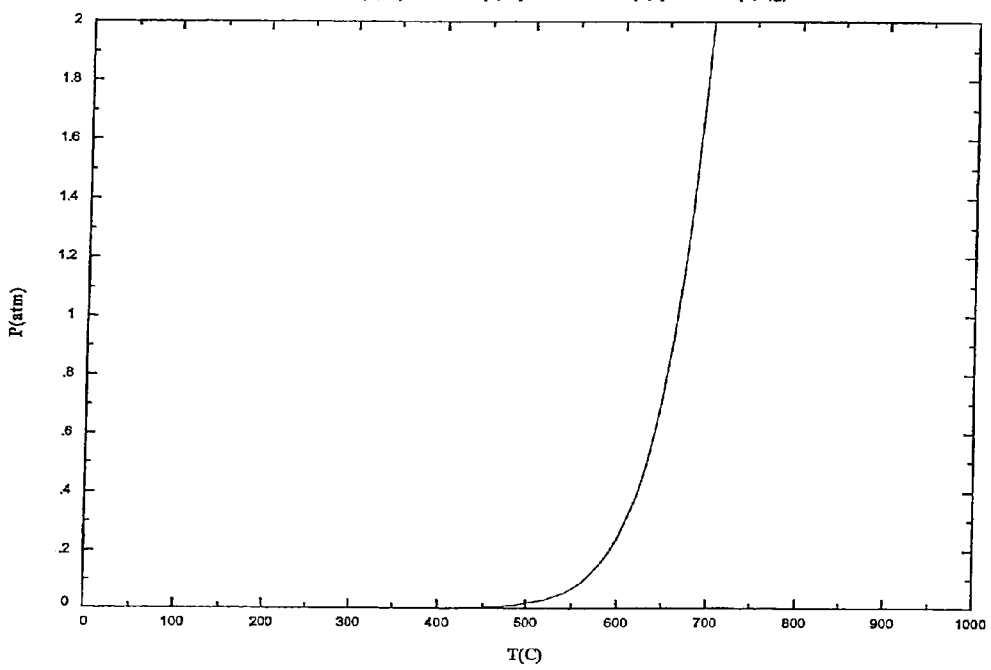
FIG. 4 is a graph illustrating a relationship between the concentration of $CO_2$ in an atmosphere and a reaction temperature expressed by formula (2).
Figure 5:
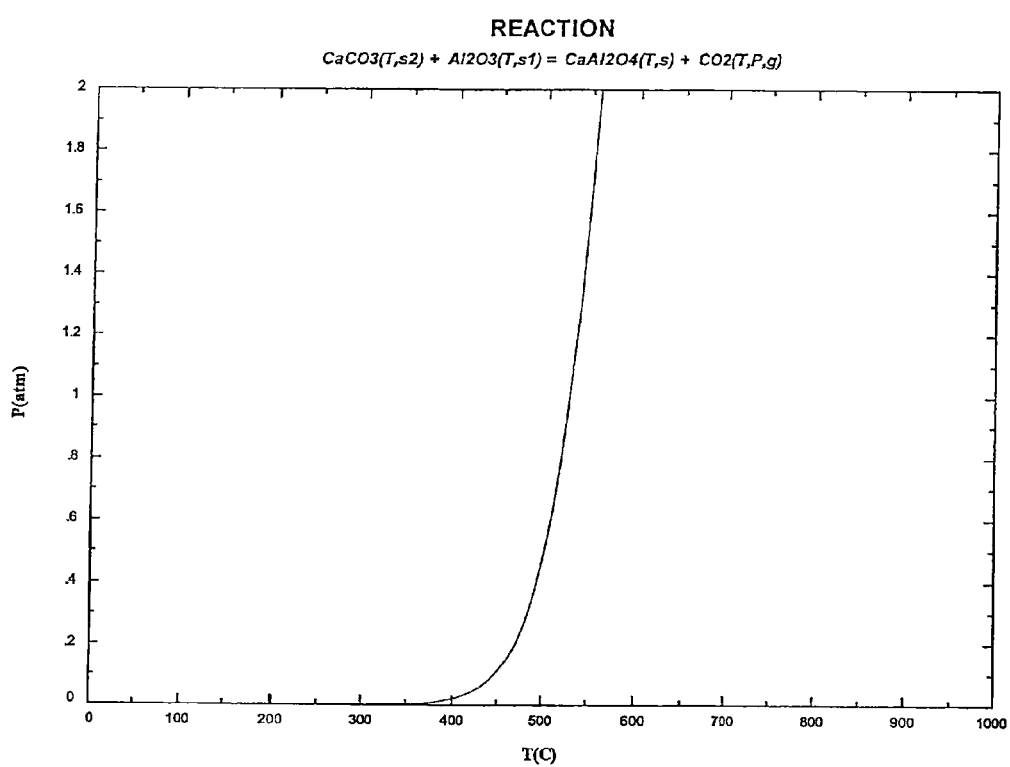
FIG. 5 is a graph illustrating a relationship between the concentration of $CO_2$ in an atmosphere and a reaction temperature expressed by formula (3).
Figure 6:
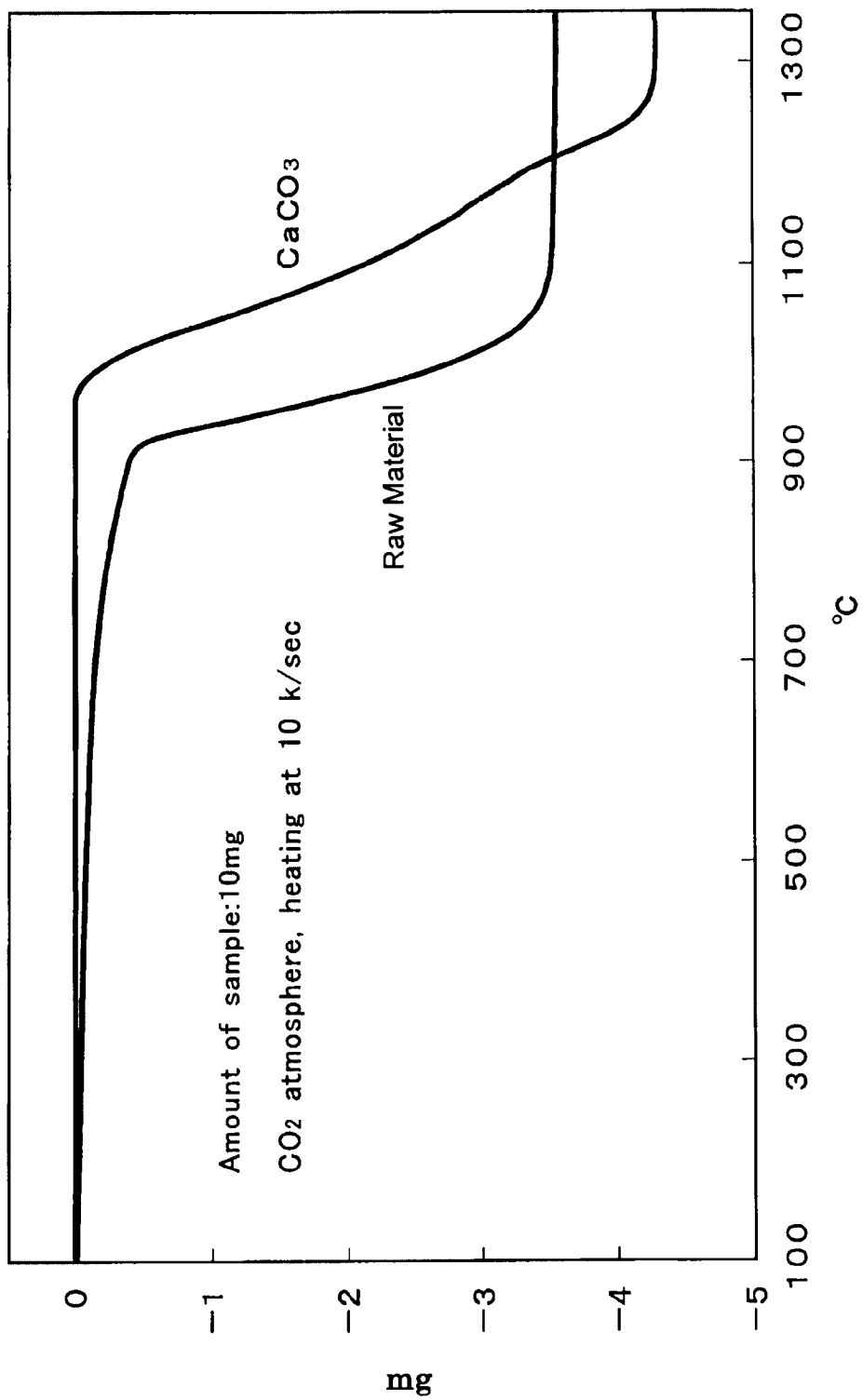
FIG. 6 is a graph illustrating a difference of starting temperatures and ending temperatures of a calcination reaction between the case when the cement material is calcined and the case when limestone is solely calcined in $CO_2$ atmosphere.

FIG. 2 illustrates a second embodiment of the systems for recovering the $CO_2$ gas according to the present invention. The same components as those illustrated in FIG. 1 are denoted by the same reference numerals, and the descriptions will be simplified.

In this recovery system, a branch pipe 30 for branching one part of the above described cement material is provided in a return line 22 through which the calcined cement material is returned from a cyclone 21 to a kiln inlet part 2 of a rotary kiln 1. This branch pipe 30 is introduced to a heat exchanger 31.

This heat exchanger 31 is a device for heating an air which is sent from a feed pipe 32 for air, with the above described high-temperature (for instance, approximately 900° C.) cement material which is sent from the branch pipe 30, and a transfer line 33 for returning the cement material having the lowered temperature (for instance, approximately 300° C.) to the first preheater 3 is connected to the outlet side of the branch pipe 30. On the other hand, a feed pipe 34 for feeding the air as air for combustion in a medium-heating furnace 14 is connected to the outlet side of the air which has been heated in the heat exchanger 31.

The system for recovering the $CO_2$ gas having the above described structure according to the second embodiment returns one part of the cement material containing much CaO by being calcined in the mixing calciner 12 to the first preheater 3 through the branch pipe 30, the heat exchanger 31 and the transfer line 33, and accordingly the above described cement material absorbs the $CO_2$ gas in the combustion exhaust gas originating in the fuel, as is expressed by $CaO + CO_2 \rightarrow CaCO_3$, by coming in contact with a combustion exhaust gas for heating the cement material in the first preheater 3.

Thus produced $CaCO_3$ is sent to the mixing calciner again together with the cement material, and is calcined therein.

As a result, the $CO_2$ gas which is generated by the combustion in the main burner 5 of the rotary kiln 1 and in the burner 14a of the medium-heating furnace 14 and originates in the fuel can also be recovered, as well as the $CO_2$ gas which is generated when the cement material is calcined in the mixing calciner 12 and originates in the cement material.

In addition, the system for recovering the $CO_2$ gas heat-exchanges one part of the cement material which has been discharged from the mixing calciner 12 and has such a high temperature as approximately 900° C. with air in the heat exchanger 31 to lower the temperature to approximately 300° C.; then returns the one part of the cement material to the first preheater 3 from the transfer line 33; also feeds the above described air which has been heated in the above described heat exchanger 31 to the medium-heating furnace 14 from the feed pipe 34 as air for combustion; and accordingly can further effectively use the thermal energy in the system.

At this time, the lower stage of the first preheater 3 forms an atmosphere at a temperature of approximately 800° C., but in spite of this, a cement material having a temperature of approximately 300° C. which is lower than the first-mentioned temperature results in being fed to the lower stage. However, because the above described reaction expressed by $CaO+CO_2 \rightarrow CaCO_3$ is an exothermic reaction, there is no risk that a heat balance in the first preheater 3 comes undone.

Third Embodiment

Figure 7:
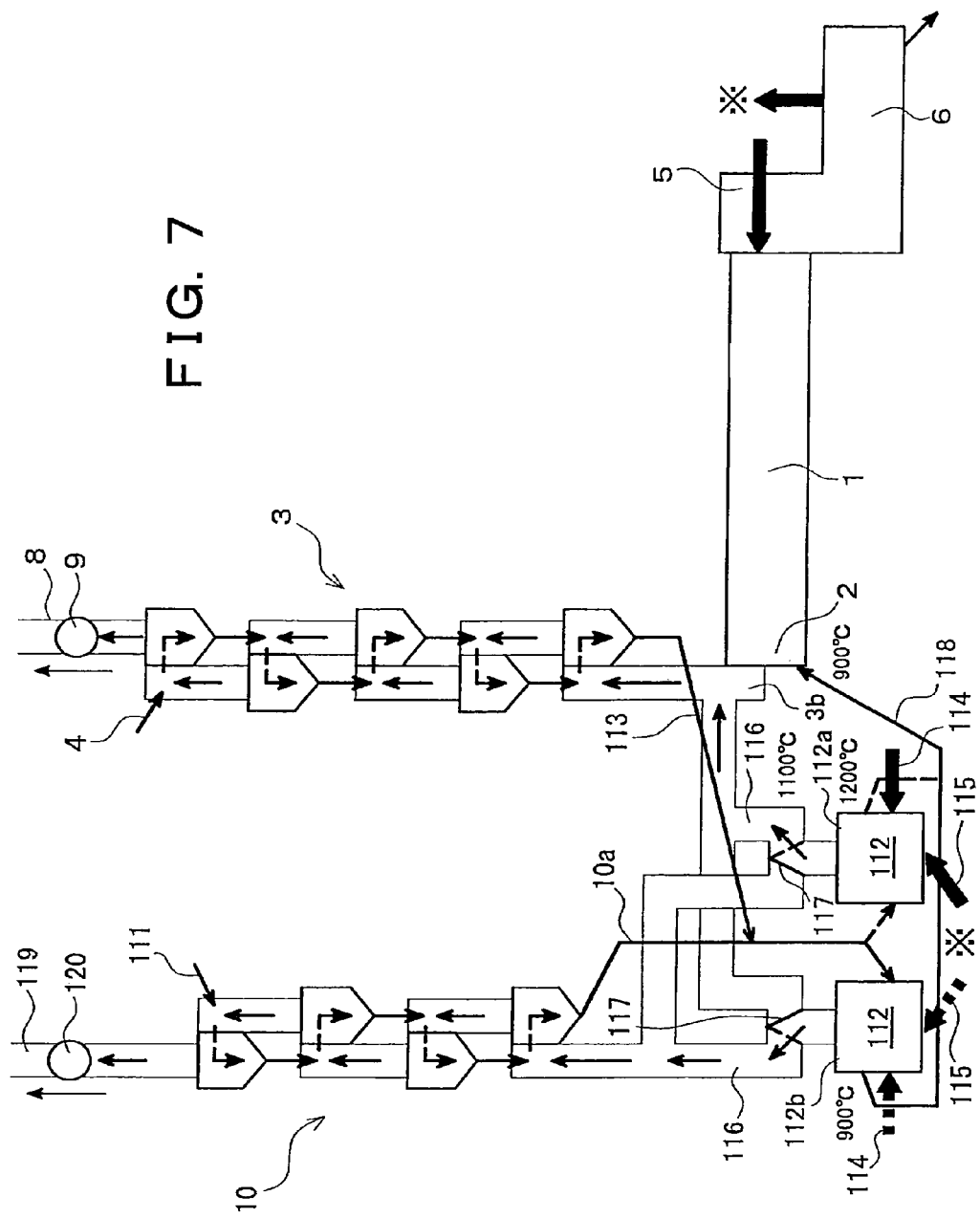
FIG. 7 is a schematic block diagram illustrating a third embodiment of the systems for recovering the $CO_2$ gas according to the present invention.

FIG. 7 illustrates a third embodiment of systems for recovering the $CO_2$ gas n in cement-manufacturing facilities according to the present invention, and the third embodiment has the same structure concerning the cement-manufacturing facility as that in FIG. 16. Accordingly, the same portions are denoted by the same reference numerals, and the description thereof will be simplified.

In FIG. 7, reference numeral 10 denotes a second preheater 10 which is provided independently from the preheater (first preheater) 3 in the cement manufacturing facility.

This second preheater 10 is constituted by a plurality of stages of cyclones which are serially arranged in a vertical direction similarly to the above described first preheater 3, and is constituted so that a cement material before calcination (uncalcined cement material) k is fed to the cyclone in the uppermost stage from a feed line 111. The upper end of a transfer pipe 10a is connected to the bottom part of the cyclone in the lowermost stage of the second preheater 10, and the lower end of this transfer pipe 10a is introduced to a regenerative calciner 112. This regenerative calciner 112 is constituted by a first regenerative calciner 112a and a second regenerative calciner 112b, and the lower end of the transfer pipe 10a is introduced to each of the regenerative calciners.

On the other hand, the above described first preheater 3 of the above described cement-manufacturing facility has an extraction line 113 for extracting the uncalcined cement material k from the cyclone in the lowermost stage, and the head part of this extraction line 113 is connected to the transfer pipe 10a which is connected to the second preheater 10. Thereby, the uncalcined cement material k sent from the second preheater 10 and the uncalcined cement material k sent from the above described first preheater 3 are introduced into the regenerative calciner 112.

Figure 8:
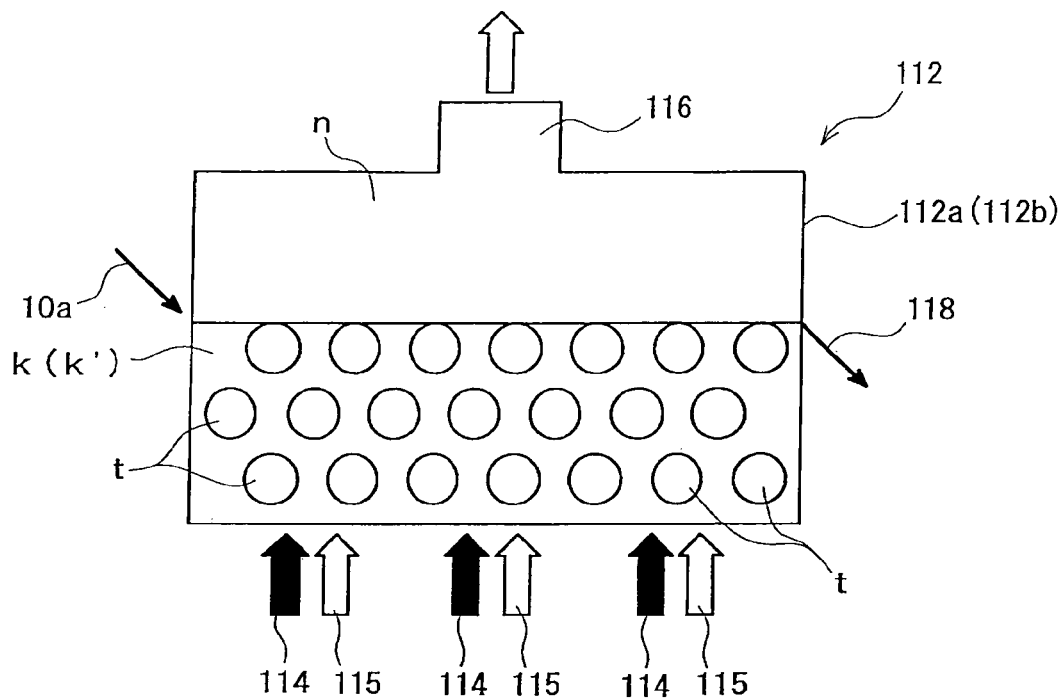
FIG. 8 is an explanatory drawing for describing a regenerative calciner of the third embodiment of the systems for recovering the $CO_2$ gas according to the present invention.

Furthermore, this system for recovering the $CO_2$ gas n has the first regenerative calciner 112a and the second regenerative calciner 112b provided in parallel to each other therein. As for these first regenerative calciner 112a and second regenerative calciner 112b, the inner part of the horizontal regenerative calciner 112 is filled with a heat medium t having a particle diameter larger than that of the uncalcined cement material k, as is illustrated in FIG. 8. This charged heat medium t is any one of a cement clinker which has been discharged from a clinker cooler 6, silica stone and quicklime. Burners 114 for heating the inner parts are provided in the bottom parts, respectively, and introduction pipes 115 for introducing a bleed air sent from the clinker cooler 6 as air for combustion are also provided in the bottom parts, respectively. Furthermore, transfer pipes 10a for introducing the uncalcined cement material k are provided in one side of the side faces, and return lines 118 for returning the cement material (calcined cement material) k' which has been calcined and separated from the $CO_2$ gas n to a kiln inlet part 2 of a rotary kiln 1 are provided in the other side of the side faces, respectively. Moreover, these first regenerative calciner 112a and second regenerative calciner 112b have exhaust gas pipes 116 for exhausting a combustion exhaust gas or the $CO_2$ gas n in the inner parts provided in the ceiling parts thereof.

The exhaust gas pipes 116 are connected to the exhaust gas pipe 3b which is connected to the rotary kiln 1, and the first preheater 3, and to the second preheater 10, and have switching valves 117 respectively provided therein which switch between the combustion exhaust gas and the $CO_2$ gas n that are discharged from the regenerative calciners 112 and introduce a switched gas to the switched direction. This switching valve 117 is provided, for instance, so as to send the combustion exhaust gas to be discharged to the first preheater 3 when the regenerative calciner 112 stores heat therein, and send the $CO_2$ gas n to be discharged to the second preheater 10 when the regenerative calciner 112 calcines the cement material, thus to switch paths of the exhaust gas pipe 116.

Figure 9:
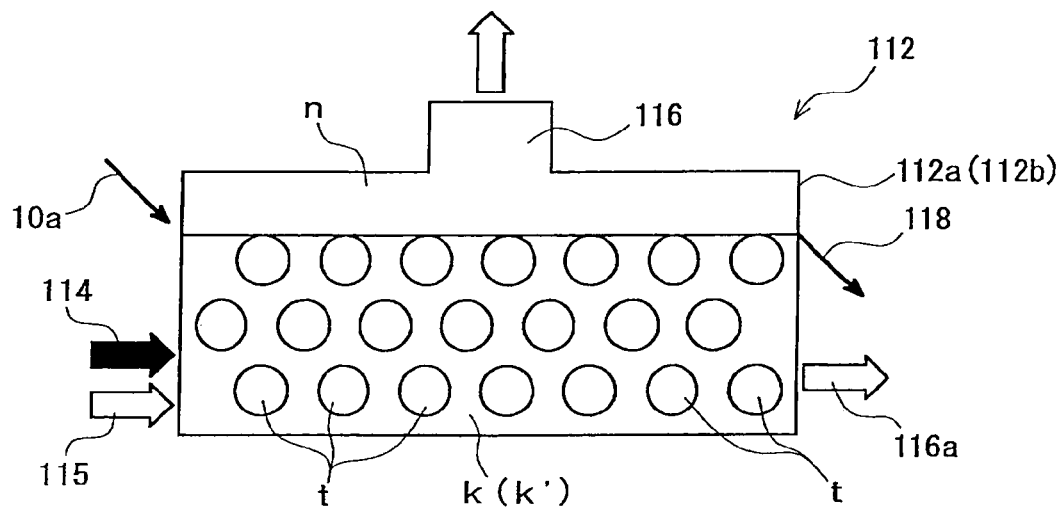
FIG. 9 is an explanatory drawing for describing a modified example of the regenerative calciner of FIG. 8 which illustrates the third embodiment of the systems for recovering the $CO_2$ gas according to the present invention.

Furthermore, the regenerative calciners 112 in FIG. 9, which are a modified example of the horizontal regenerative calciners 112 illustrated in FIG. 8, have burners 114 for heating the inner parts, and introduction pipes 115 for introducing the bleed air sent from the clinker cooler 6 as air for combustion provided in one side of the lower side faces of the first regenerative calciner 112a and the second regenerative calciner 112b, respectively. The regenerative calciners 112 also have the discharge gas pipes 116a for discharging the combustion exhaust gas generated when the regenerative calciners 112 are heated and store heat therein provided in the other side of the lower side faces. The discharge pipe 116a discharges the combustion exhaust gas when the regenerative calciner 112 stores heat therein.

Figure 10:
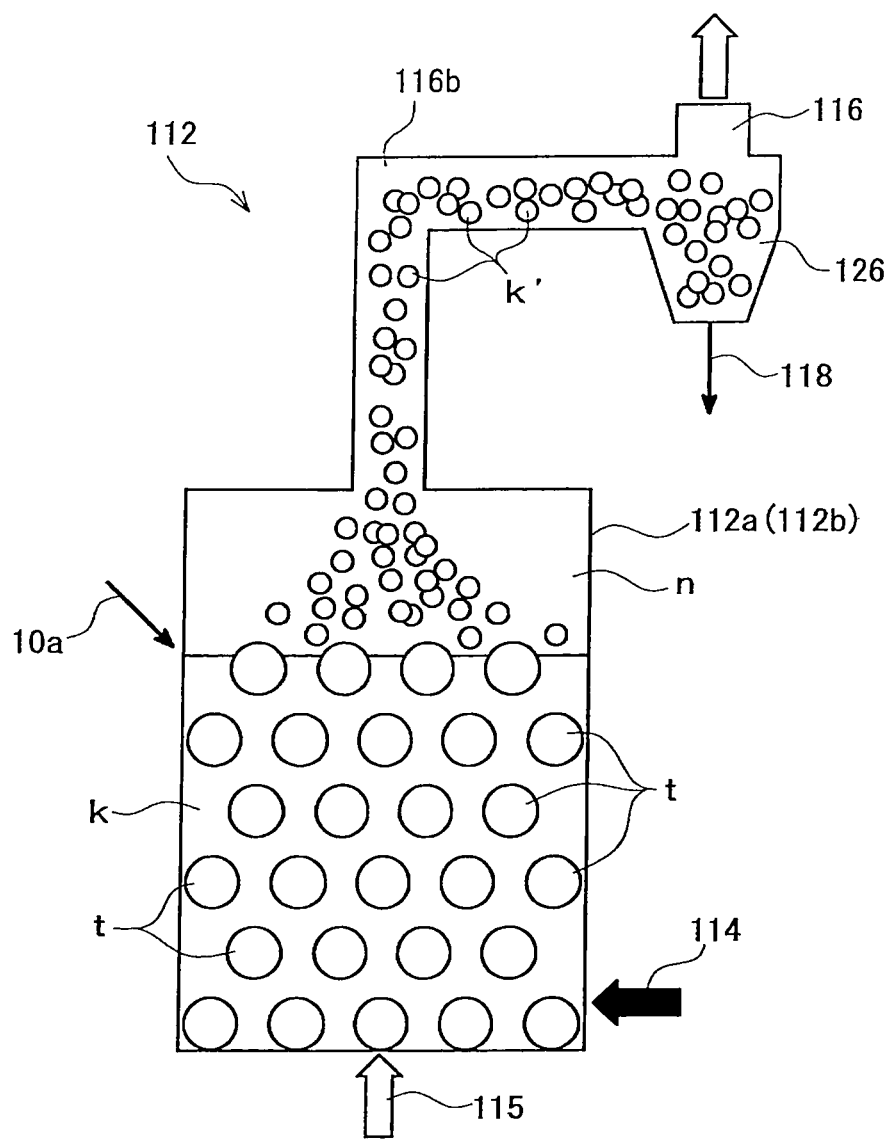
FIG. 10 is an explanatory drawing for describing another modified example of the regenerative calciner of the third embodiment of the systems for recovering the $CO_2$ gas according to the present invention.

In addition, in the modified example of the regenerative calciner 112 illustrated in FIG. 10, the inner part of the vertical regenerative calciner 112 is filled with a heat medium t having a particle diameter larger than that of the uncalcined cement material k. In addition, the regenerative calciners 112 have burners 114 for heating the inner parts provided in the lower side faces, respectively, and introduction pipes 115 for introducing the bleed air sent from the clinker cooler 6 as air for combustion provided in the bottom parts. Furthermore, the regenerative calciners 112 have the transfer pipes 10a for introducing the uncalcined cement material k provided in one side of the side faces. In addition, these first regenerative calciner 112a and second regenerative calciner 112b have discharge pipes 116b for discharging the combustion exhaust gas or the $CO_2$ gas n in the inner part provided in the ceiling parts, and have cyclones 126 provided in the outlet side of these exhaust pipes 116b. In the ceiling part of this cyclone 126, there is provided an exhaust gas pipe 116 for exhausting the combustion exhaust gas or the $CO_2$ gas n, and in the bottom part, there is provided a return line 118 for returning the calcined cement material k' which has been separated from the $CO_2$ gas n that has been generated during the calcination to the kiln inlet part 2 of the rotary kiln 1.

In addition, the exhaust gas pipes 116 are connected to the exhaust gas pipe 3b which is connected to the rotary kiln 1, and the first preheater 3, and to the second preheater 10, and have switching valves 117 respectively provided therein which switch between the combustion exhaust gas and the $CO_2$ gas n that are discharged from the regenerative calciners 112 and introduce a switched gas to the switched direction. This switching valve 117 is provided, for instance, so as to send the combustion exhaust gas to be discharged to the first preheater 3 when the regenerative calciner 112 stores heat therein, and send the $CO_2$ gas n to be discharged to the second preheater 10 when the regenerative calciner 112 calcines the cement material, thus to switch paths of the exhaust gas pipe 116.

For information, reference numeral 119 in the figure denotes an exhaust line of the $CO_2$ gas n, and reference numeral 120 denotes an exhaust fan of the $CO_2$ gas n.

Next, one embodiment of methods for recovering the $CO_2$ gas n according to the present invention using the above described system for recovering the $CO_2$ gas n illustrated in the third embodiment will be described below.

Firstly, the uncalcined cement material k is fed to the above described cyclones in the uppermost stages of the first preheater 3 and the second preheater 10 from the feed lines 4 and 111, respectively.

Then, the uncalcined cement material k is preheated by the exhaust gas which is fed from the rotary kiln 1 through the exhaust gas pipe 3b and by the combustion exhaust gas sent from the first regenerative calciner 112a, in the process of being sequentially sent to the cyclones in the lower parts, in a similar way to that in a conventional process in the above described preheater 3. Then, the uncalcined cement material k which has been preheated up to a temperature (for instance, approximately 810° C.) just below the calcination temperature is fed to the second regenerative calciner 112b from the extraction line 113 through the transfer pipe 10a.

The uncalcined cement material k which has been fed to the second preheater 10 is preheated by the $CO_2$ gas n which has been generated by the calcination of the cement material in the regenerative calciner 112b, is preheated finally up to a temperature (for instance, approximately 760° C.) just below the calcination temperature, and is fed to the second regenerative calciner 112b from the transfer pipe 10a.

On the other hand, in the second regenerative calciner 112b, as is illustrated in FIG. 8 and FIG. 9, the uncalcined cement material k fed from a transfer pipe 10a is mixed with the cement clinker (heat medium) t which has been charged into the inner part, has been heated and has stored heat therein beforehand, is heated to a calcination temperature or higher (for instance, 900° C.) and is calcined therein. At this time, $CO_2$ gas n is also generated.

Then, the $CO_2$ gas n generated in the second regenerative calciner 112b is introduced to the second preheater 10 from an exhaust gas pipe 116, as a heating medium. At this time, a switching valve 117 provided in the exhaust gas pipe 116 opens a path which leads to the second preheater 10, intercepts a path which leads to the first preheater 3, and introduces the $CO_2$ gas n to the second preheater 10. In addition, a calcined cement material k' is fluidized by $CO_2$ gas n generated during calcination, overflows therefrom, is returned to a kiln inlet part 2 of the cement kiln 1 from a return line 118, and is finally fired in the rotary kiln 1.

In addition, in a modified example illustrated in FIG. 10, in the second regenerative calciner 112b, the uncalcined cement material k fed from a transfer pipe 10a is mixed with a cement clinker (heat medium) t which has been charged into the inner part, has been heated and has stored heat therein beforehand, is heated to a calcination temperature or higher (for instance, 900° C.) and is calcined. At this time, $CO_2$ gas n is also generated.

The $CO_2$ gas n generated in the second regenerative calciner 112b entrains the calcined cement material k', and is introduced to the cyclone 126 from the exhaust pipe 116b. Then, the $CO_2$ gas n and the calcined cement material k' are separated from each other in the cyclone 126. The calcined and separated cement material k' is introduced to the kiln inlet part 2 of the cement kiln 1 from the return line 118 which is provided in the bottom part. In addition, the separated $CO_2$ gas n is introduced to the second preheater 10 from the exhaust gas pipe 116 in the ceiling part, as a heating medium. At this time, a switching valve 117 provided in the exhaust gas pipe 116 opens the path which leads to the second preheater 10, intercepts the path which leads to the first preheater 3, and introduces the $CO_2$ gas n to the second preheater 10.

On the other hand, in the first regenerative calciner 112a, the cement clinker (heat medium) t charged in the inner part of the first regenerative calciner 112a is heated to the calcination temperature of the uncalcined cement material k or higher (for instance, 1,200° C.) by a burner 114 and a bleed air which has been introduced from a clinker cooler 6 through an introduction pipe 115 and has stored heat therein, while the second regenerative calciner 112b conducts calcination. A combustion exhaust gas discharged at this time is introduced to the above described first preheater 3 from the exhaust gas pipe 116, as the heating medium. At this time, the switching valve 117 provided in the exhaust gas pipe 116 opens the path which leads to the first preheater 3, intercepts the path which leads to the second preheater 10, and introduces the combustion exhaust gas to the first preheater 3. At this time, in the regenerative calciner 112 illustrated in FIG. 9, which is a modified example of the regenerative calciner 112 illustrated in FIG. 8, the combustion exhaust gas is discharged from the discharge pipe 116a. Thereby, the cement clinker (heat medium) t can be efficiently heated by the combustion exhaust gas. In addition, in this case, the exhaust gas pipe 116 provided in the ceiling part is closed.

Incidentally, though the cement clinker (heat medium) t needs to be heated to the high temperature of approximately 1,200° C. and store heat therein, the temperature of the exhaust gas sent from the rotary kiln 1 is 1,100 to 1,200° C. Accordingly, the above described exhaust gas can be effectively used by introducing the total amount or the fixed amount of the exhaust gas sent from the rotary kiln 1 to the regenerative calciner 112a and sending the exhaust gas again from the exhaust gas pipe 116 to the above described first preheater 3.

Furthermore, as illustrated in FIG. 10, in the regenerative calciner 112 of another modified example, the combustion exhaust gas is introduced from the exhaust pipe 116b provided in the ceiling part to the cyclone 126, and is introduced to the above described first preheater 3 from the exhaust gas pipe 116, as the heating medium.

In addition, the second regenerative calciner 112b heats the cement clinker (heat medium) t which has been charged in the inner part again by the burner 114 and the bleed air introduced from the clinker cooler 6 through the introduction pipe 115 and makes the cement clinker store heat therein, after having calcined the cement material k. At this time, the switching valve 117 provided in the exhaust gas pipe 116 opens the path which leads to the first preheater 3, intercepts the path which leads to the second preheater 10, and introduces the combustion exhaust gas to the first preheater 3.

On the other hand, in the first regenerative calciner 112a which has stored heat therein, the uncalcined cement material k fed from the transfer pipe 10a is mixed with the cement clinker (heat medium) t, is heated to the calcination temperature or higher (for instance, 900° C.) and is calcined, after the operation of the burner 114 has been stopped. At this time, the $CO_2$ gas n is also generated.

Then, the $CO_2$ gas n generated in the first regenerative calciner 112a is introduced to the second preheater 10 from the exhaust gas pipe 116, as a heating medium. At this time, the switching valve 117 provided in the exhaust gas pipe 116 opens the path which leads to the second preheater 10, intercepts the path which leads to the first preheater 3, and introduces the $CO_2$ gas n to the second preheater 10. In addition, the calcined cement material k' is fluidized by $CO_2$ gas n generated during calcination, overflows therefrom, is returned to the kiln inlet part 2 of the cement kiln 1 from a return line 118, and is finally fired in the rotary kiln 1.

Thus, the above described method and system for recovering the $CO_2$ gas in the cement-manufacturing facility can continuously recover the $CO_2$ gas by repeating calcination, heating and heat storage while using the first regenerative calciner 112a and the second regenerative calciner 112b, and also can simplify the facility. In addition, the method and system effectively uses a heating source in the cement-manufacturing facility, and can recover the $CO_2$ gas n which originates in the cement material and occupies a half or more of the $CO_2$ gas n generated in the cement-manufacturing facility, in a high concentration of nearly 100%.

At this time, because the uncalcined cement material k is heated and calcined by the cement clinker which has a large particle diameter different from that of the uncalcined cement material k and accordingly has an extremely small specific surface area as a heat medium t in the regenerative calciner 112, the sticking or fusion-bonding among the above described heat media or between the heat medium and a furnace wall is suppressed even when the above described cement clinker t is heated to 1,000° C. which is the calcination temperature or higher in the regenerative calciner 112, and the occurrence of a coating trouble and the like can be suppressed.

In addition, the method and system return the high-temperature cement material k' which has been sufficiently calcined in the regenerative calciner 112 to the rotary kiln 1 from the return line 118 and accordingly can reduce the fuel necessary for burning a cement material in the rotary kiln 1. As a result, the cement manufacturing facility can use a rotary kiln 1 which has a shorter longitudinal dimension than that of a conventional one.

Fourth Embodiment

Figure 11:
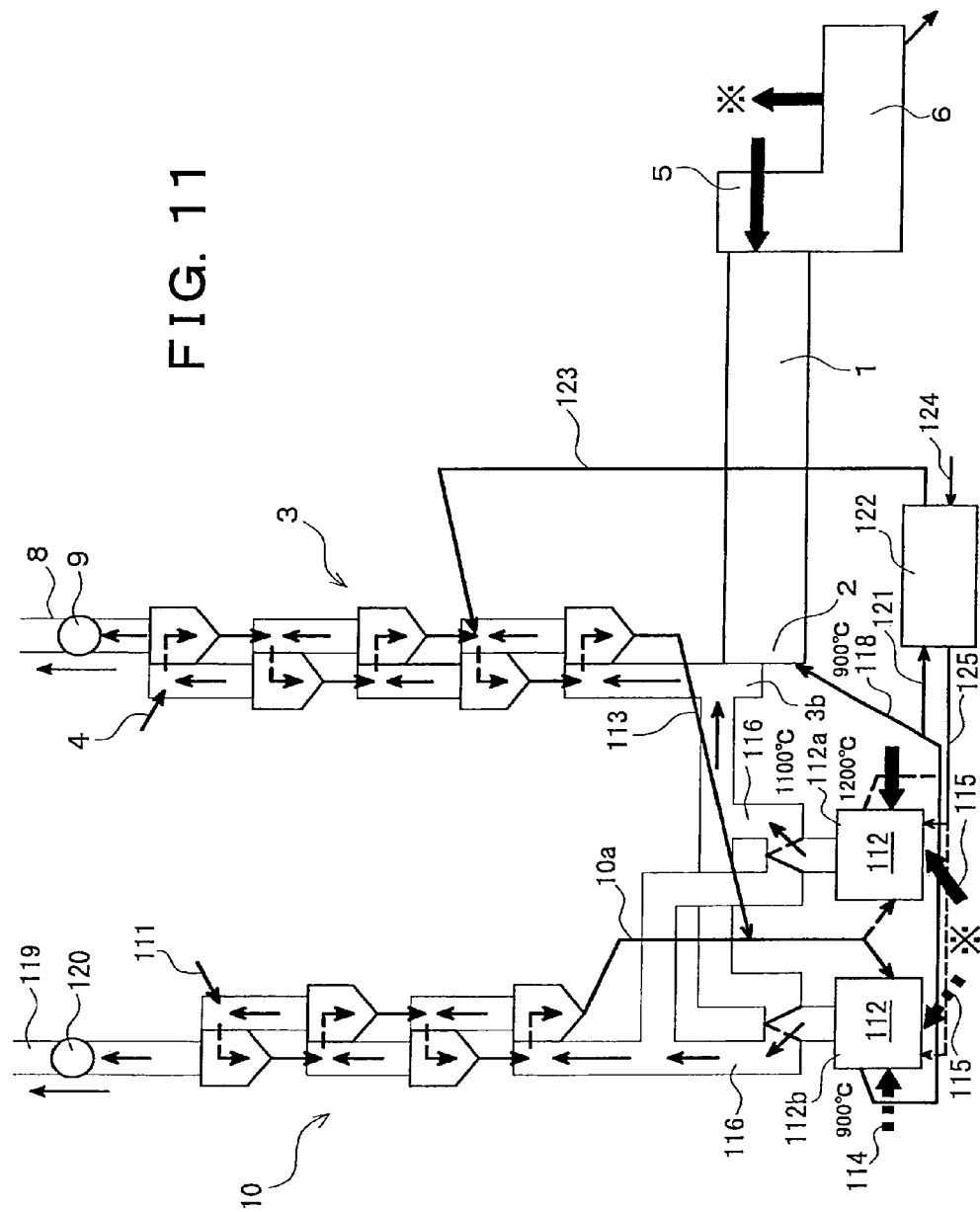
FIG. 11 is a schematic block diagram illustrating a fourth embodiment of the systems for recovering the $CO_2$ gas according to the present invention.
Figure 12:
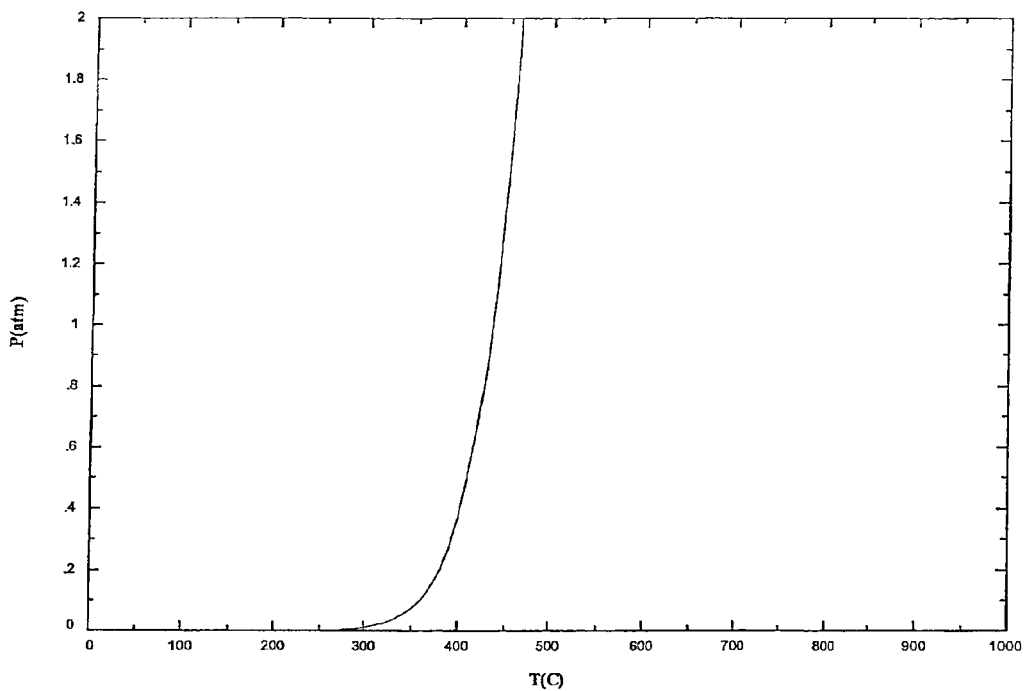
FIG. 12 is a graph illustrating a relationship between the concentration of $CO_2$ in an atmosphere and a reaction temperature expressed by formula (1).
Figure 13:
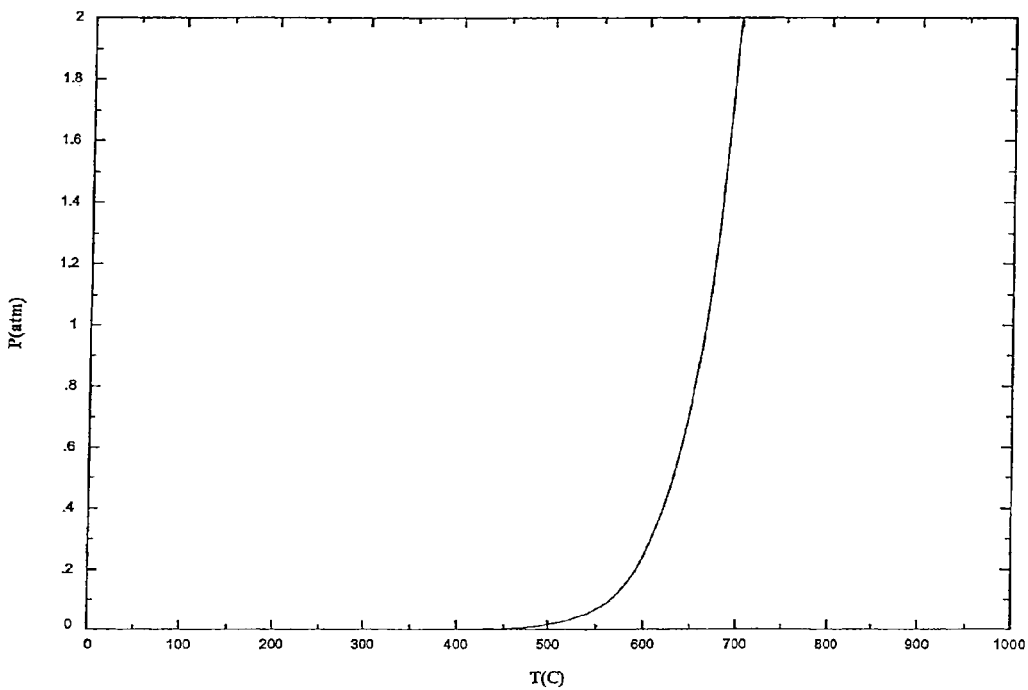
FIG. 13 is a graph illustrating a relationship between the concentration of $CO_2$ in an atmosphere and a reaction temperature expressed by formula (2).
Figure 14:
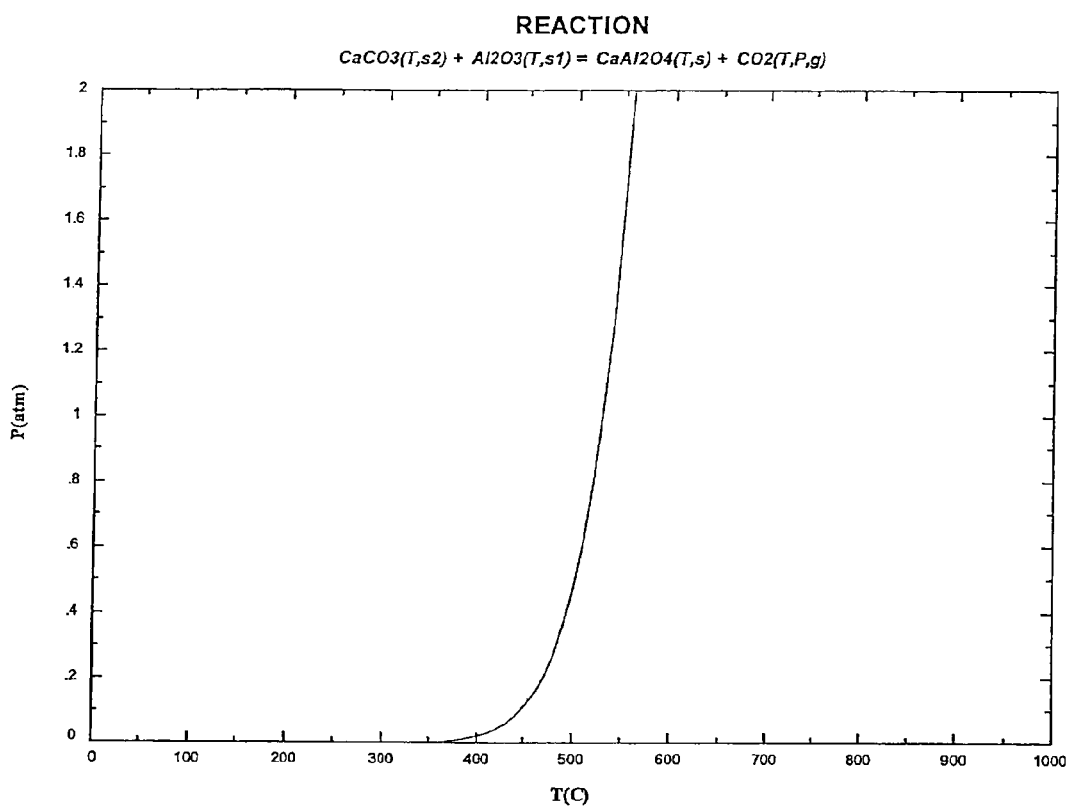
FIG. 14 is a graph illustrating a relationship between concentration of $CO_2$ in an atmosphere and a reaction temperature expressed by formula (3).
Figure 15:
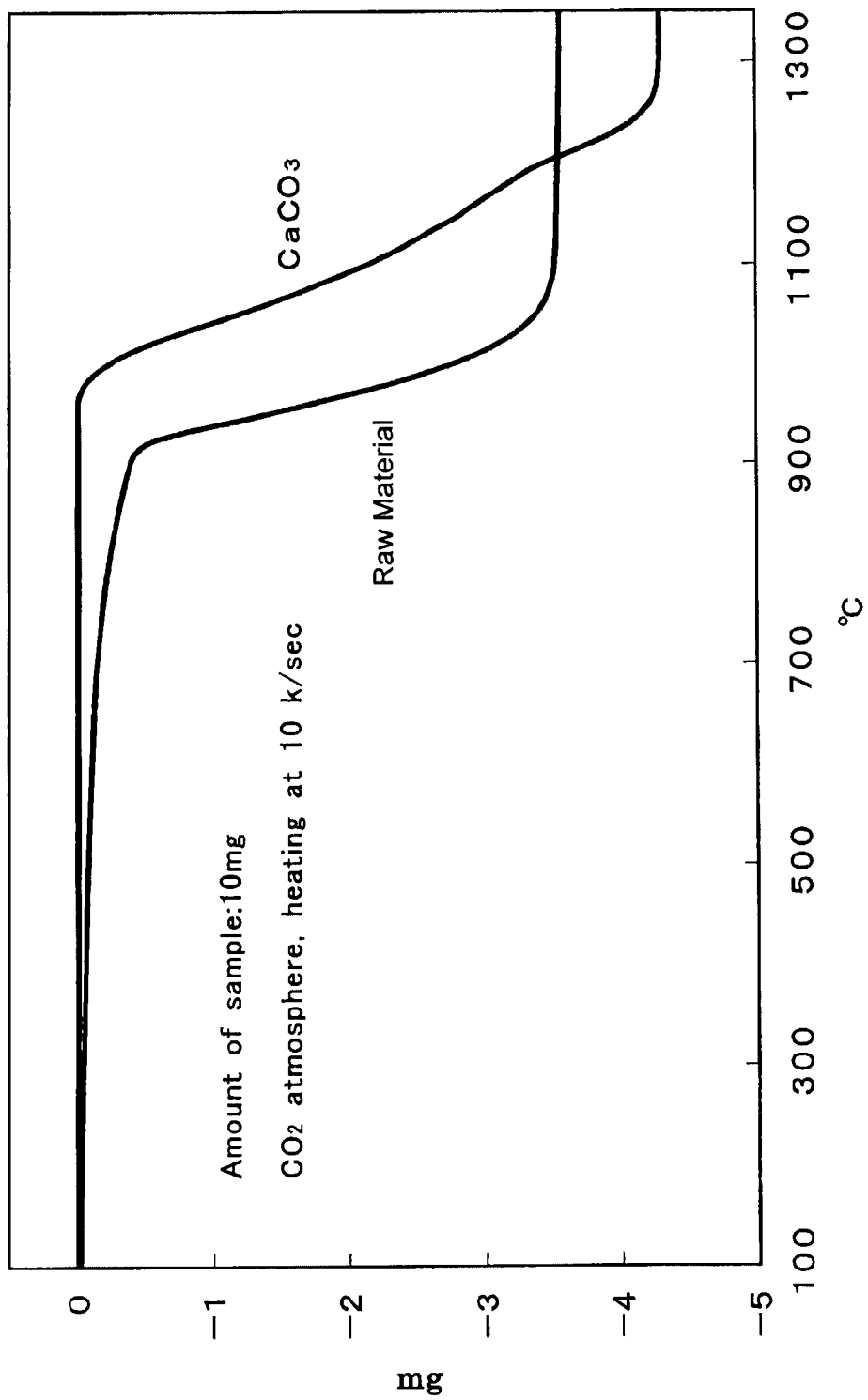
FIG. 15 is a graph illustrating a difference of starting temperatures and ending temperatures of a calcination reaction between the case when the cement material is calcined and the case when limestone is solely calcined in $CO_2$ atmosphere.

FIG. 11 illustrates a fourth embodiment of the systems for recovering the $CO_2$ gas n according to the present invention. The same components as those illustrated in FIG. 16 are likewise denoted by the same reference numerals, and the descriptions will be simplified.

In this recovery system, a branch pipe 121 for branching one part of the calcined cement material k' is provided in a return line 118 through which the calcined cement material k' is returned to a kiln inlet part 2 of a rotary kiln 1 from a regenerative calciner 112. This branch pipe 121 is introduced to a heat exchanger 122.

This heat exchanger 122 is a device for heating air which is sent from a feed pipe 124 for air, with the high-temperature (for instance, 900° C.) calcined cement material k' which is sent from the branch pipe 121, and a transfer line 123 for returning the calcined cement material k' having the lowered temperature (for instance, 300° C.) to the first preheater 3 is connected to the outlet side of the branch pipe 121. On the other hand, a feed pipe 125 for feeding the air as air for combustion in the regenerative calciner 112 is connected to the outlet side of the air which has been heated in the heat exchanger 122.

The system for recovering the $CO_2$ gas n having the above described structure according to the fourth embodiment returns one part of the cement material containing much CaO by being calcined in the regenerative calciner 112 to the first preheater 3 through the branch pipe 121, the heat exchanger 122 and the transfer line 123, and accordingly the calcined cement material k' absorbs the $CO_2$ gas n in the combustion exhaust gas originating in the fuel, as is expressed by $CaO+CO_2 \rightarrow CaCO_3$, by coming in contact with a combustion exhaust gas for heating the uncalcined cement material k in the first preheater 3.

Thus produced $CaCO_3$ is sent to the regenerative calciner again together with the uncalcined cement material k and is calcined there.

As a result, the $CO_2$ gas n which is generated by the combustion in the main burner 5 of the rotary kiln 1 and in the burner 114 of the regenerative calciner 112 and originates in the fuel can also be recovered, as well as the $CO_2$ gas n which is generated when the cement material is calcined in the regenerative calciner 112 and originates in the uncalcined cement material k.

In addition, the system for recovering the $CO_2$ gas heat-exchanges one part of the calcined cement material k' which has been discharged from the regenerative calciner 112 and has such a high temperature as approximately 900° C. with air in the heat exchanger 122 to lower the temperature to approximately 300° C.; then returns the resultant cement material to the first preheater 3 from the transfer line 123; also feeds the above described air which has been heated in the heat exchanger 122 to the regenerative calciner 112 from the feed pipe 125 as air for combustion; and accordingly can further effectively use the thermal energy in the system.

At this time, the lower stage of the first preheater 3 forms an atmosphere at a temperature of approximately 800° C., but in spite of this, an uncalcined cement material k having a temperature of approximately 300° C. which is lower than the temperature results in being fed to the lower stage. However, because the above described reaction expressed by $CaO+CO_2 \rightarrow CaCO_3$ is an exothermic reaction, there is no risk that a heat balance in the first preheater 3 comes undone.

INDUSTRIAL APPLICABILITY

According to the present invention, there are provided methods and systems for recovering $CO_2$ gas in cement-manufacturing facilities, which can separate and recover $CO_2$ gas generated in the cement-manufacturing facilities in a high concentration by effectively using a heating source in the cement-manufacturing facilities, and processes for manufacturing the cement.

REFERENCE SIGNS LIST

1 Rotary kiln (Cement kiln)
3 Preheater (First preheater)
10 Second preheater
10a Transfer pipe
12 Mixing calciner
13 Extraction line
14 Medium-heating furnace
15 Heat-medium feed pipe
19 Heat-medium return pipe
21 Cyclone
22 Return line
25 Exhaust line of $CO_2$ gas
31 Heat exchanger
33 Transfer line of cement material
34 Feed pipe of combustion air
112 Regenerative calciner
113 Extraction line
116 Exhaust gas pipe
118 Return line
122 Heat exchanger
125 Feed pipe of combustion air k Uncalcined cement material (cement material before calcination)
k' Calcined cement material (cement material which has been calcined)

The invention claimed is:

1. A method for recovering $CO_2$ gas generated in a cement-manufacturing facility, the method comprising:
    feeding a non-calcined cement material, which has been extracted from a first preheater, to a mixing calciner;
    heating a heat medium, having a particle diameter larger than that of the cement material, to a calcination temperature or higher in a medium-heating furnace;
    feeding the heat medium to the mixing calciner;
    calcining the non-calcined cement material with the heat medium in the mixing calciner;
    separating a cement material which has been calcined from the heat medium;
    feeding the cement material which has been calcined to a cement kiln;
    returning the heat medium to the medium heating furnace and circulating the heat medium between the medium-heating furnace and the mixing calciner; and
    recovering $CO_2$ gas generated by the calcining of the non-calcined cement material in the mixing calciner,
    wherein the cement-manufacturing facility preheats the non-calcined cement material in the first preheater, then feeds the preheated cement material to the mixing calciner and then to the cement kiln having an atmosphere in an inner part held at high temperature, and then burns the fed cement material,
    wherein the heat medium is a cement clinker obtained by burning the cement material in the cement kiln, quicklime of the formula CaO, silica stone of the formula $SiO_2$, aluminum of the formula $Al_2O_3$, a heat-resistant alloy, or a mixture thereof.

2. The method of claim 1, further comprising:
    feeding the non-calcined cement material, which has been extracted from the first preheater, and another non-calcined cement material, which has been preheated in a second preheater independent from the first preheater, to the mixing calciner;
    heating the second preheater with $CO_2$ gas generated in the mixing calciner; and
    recovering resultant $CO_2$ gas.

3. The method of claim 1, further comprising:
    extracting the heat medium from a bottom part of the mixing calciner;
    returning the heat medium to an upper part of the mixing calciner;
    contacting the heat medium with $CO_2$ gas discharged from the mixing calciner to separate the cement material from the heat medium; and
    returning resultant heat medium to the medium-heating furnace.

4. The method of claim 1, further comprising returning one part of the cement material, which has been calcined in the mixing calciner, to the first preheater.

5. The method of claim 4, further comprising:
    heat-exchanging one part of the calcined cement material with air, and returning the calcined cement material which has been cooled with air to the first preheater; and
    feeding heated air as air for combustion in the medium-heating furnace.

6. A method for recovering $CO_2$ gas generated in a cement-manufacturing facility, the method comprising:
    feeding a non-calcined cement material, which has been extracted from a first preheater, to a mixing calciner;
    heating a heat medium, having a particle diameter larger than that of the cement material, to a calcination temperature or higher in a medium-heating furnace;
    feeding the heat medium to the mixing calciner;
    calcining the non-calcined cement material with the heat medium in the mixing calciner;
    separating a cement material which has been calcined from the heat medium;
    feeding the cement material which has been calcined to a cement kiln;
    returning the heat medium to the medium heating furnace and circulating the heat medium between the medium-heating furnace and the mixing calciner; and
    recovering $CO_2$ gas generated by the calcining of the non-calcined cement material in the mixing calciner,
    wherein the cement-manufacturing facility preheats the non-calcined cement material in the first preheater, then feeds the preheated cement material to the mixing calciner and then to the cement kiln having an atmosphere in an inner part held at high temperature, and then burns the fed cement material,
    wherein the heat medium is a cement clinker obtained by firing the cement material in the cement kiln.

* * * * *